United States Patent
Gulliver et al.

(10) Patent No.: US 11,627,831 B2
(45) Date of Patent: Apr. 18, 2023

(54) ESPRESSO MACHINE WITH DOSING MECHANISM

(71) Applicant: Sunbeam Corporation Pty Ltd, Botany (AU)

(72) Inventors: Timothy Edward Gulliver, Botany (AU); Maxim K. Guyatt, Botany (AU); Mark James Whitcombe, Botany (AU)

(73) Assignee: Newell Australia Pty Ltd

( * ) Notice: Subject to any disclaimer, the term of this patent is extended or adjusted under 35 U.S.C. 154(b) by 681 days.

(21) Appl. No.: 16/612,990

(22) PCT Filed: May 14, 2018

(86) PCT No.: PCT/AU2018/050453
§ 371 (c)(1),
(2) Date: Nov. 12, 2019

(87) PCT Pub. No.: WO2018/204995
PCT Pub. Date: Nov. 15, 2018

(65) Prior Publication Data
US 2021/0274964 A1    Sep. 9, 2021

(30) Foreign Application Priority Data
May 12, 2017    (AU) .............................. 2017901762

(51) Int. Cl.
*A47J 31/36*        (2006.01)
*A47J 31/46*        (2006.01)
(Continued)

(52) U.S. Cl.
CPC ............. *A47J 31/461* (2018.08); *A47J 31/36* (2013.01); *A47J 31/4489* (2013.01);
(Continued)

(58) Field of Classification Search
CPC .. A47J 31/30; A47J 31/34; A47J 31/36; A47J 31/3609; A47J 31/4489
See application file for complete search history.

(56) References Cited

U.S. PATENT DOCUMENTS 3,991,788 A * 11/1976 Kull ...................... F16K 11/022
                                                              137/637.1
5,778,765 A *  7/1998 Klawuhn ............... A47J 31/469
                                                                    99/290
(Continued)

FOREIGN PATENT DOCUMENTS

| AU | 2010239136 B2 | 4/2016 |
|----|---------------|--------|
| CN | 201223302 Y   | 4/2009 |
| EP | 2077086 A1    | 7/2009 |

OTHER PUBLICATIONS

International Search Report and Written Opinion dated Jul. 17, 2018.

*Primary Examiner* — Reginald Alexander
(74) *Attorney, Agent, or Firm* — Husch Blackwell LLP

(57) ABSTRACT

An espresso machine is provided that utilizes a mechanical valve in addition to a flow meter. This results in a low-cost espresso machine while delivering a measured volume of water for the espresso pour. The mechanical valve facilitates a machine with both selectable espresso pour and steam and/or hot water outlets. In this embodiment, the espresso machine utilizes a shared pump and water heater (e.g., a thermoblock, boiler or similar) for multiple functions and/or through different outlets. For example, water from the reservoir may be sent through the flow meter to the pump, then to the water heater, and eventually to either the grouphead or steam wand, or to a pressure release.

7 Claims, 21 Drawing Sheets

(51) Int. Cl.
  *A47J 31/52*    (2006.01)
  *A47J 31/44*    (2006.01)
  *A47J 31/30*    (2006.01)

(52) U.S. Cl.
  CPC ......... *A47J 31/469* (2018.08); *A47J 31/5255* (2018.08); *A47J 31/30* (2013.01)

(56) References Cited

U.S. PATENT DOCUMENTS

| | | | |
|---|---|---|---|
| 7,089,849 B2* | 8/2006 | Chen | A47J 31/52 |
| | | | 99/305 |
| 7,415,921 B2* | 8/2008 | Brouwer | A47J 31/461 |
| | | | 99/283 |
| 9,038,529 B2* | 5/2015 | Riessbeck | A47J 31/461 |
| | | | 134/22.12 |
| 2013/0298776 A1 | 11/2013 | Mulder et al. | |
| 2018/0078086 A1* | 3/2018 | Affolter | A47J 31/461 |

\* cited by examiner

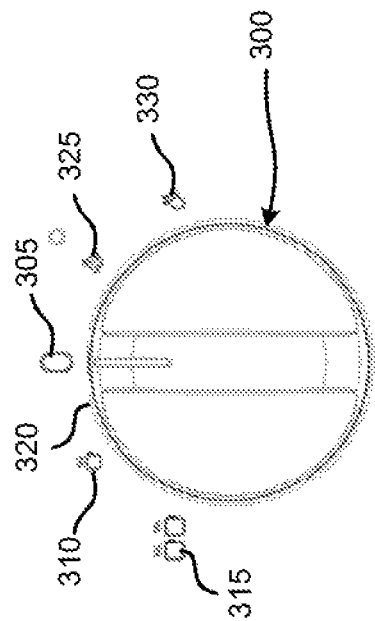

Fig 6A

|  | 2 Cup | 1 Cup | Intermediate Dump | Steam | Hot Water |
|---|---|---|---|---|---|
| SW1 | ON* | ON | OFF | OFF | ON |
| SW2 | ON | OFF | OFF | ON | ON* |
| Valve | 1 to 3 | 1 to 3 | 1 to 2 to 3 | 1 to 4 | 1 to 4 |
|  | 3 & 4 closed | 3 & 4 closed | 4 closed | 2 & 3 closed | 2 & 3 closed |
| Pump | ON until double shot poured | ON until single shot poured | OFF unless purging | 20% ON** | 50% ON*** |
| Thermo-block | 93°C | 93°C | 93° | 160°C** | 110°C*** |

Notes:
* If transition from SW1 ON, SW2 OFF to SW1 ON, SW2 ON then 2 Cup.
* If transition from SW1 OFF, SW2 ON to SW1 ON, SW2 ON then Hot Water.
** Delay when selecting Steam depending on the previous state.
*** Delay when selecting Hot Water depending on the previous state.

Fig 6B

ESPRESSO MACHINE WITH DOSING MECHANISM

CROSS-REFERENCE TO RELATED APPLICATIONS

This application claims priority to PCT Application No. PCT/AU2018/050453, filed 14 May 2018, which itself claims priority to Australian Patent Application 2017901762, filed 12 May 2017, the entirety of both of which are hereby incorporated by reference.

FIELD

The present disclosure relates to an espresso machine, and more particularly to an espresso machine with a dosing mechanism and a steam wand.

BACKGROUND

In standard espresso machines, water flow typically proceeds as follows: water tank→pump→thermoblock→control valve. The control valve then diverts the water to either the grouphead of the machine for brewing of the espresso, to a general water outlet, or to the steam wand for dispensing either hot water or steam. Known machines within the art follow two basic control valve technologies which select the flow outlet; electric solenoid valves or mechanical flow control valves. Electric solenoid valves are expensive but lend themselves to additional automation features, while mechanical valves are inexpensive but lack the ease provided by automation.

Expensive solenoid valve machines often include a flow meter between the water tank and the pump which allows for volumetric dosing. Water is measured during the espresso pour, and the pump is shut down after dispensing either 30 mL or 60 mL of water (for 1 shot or 2 shot espresso, respectively). These machines usually have buttons to select the 1 shot and 2 shot functions, and a separate dial, knob or other toggle to select steam/hot water. In contrast to this, all known machines that use mechanical valves are 'manual pour' espresso machines. They therefore pour continuously while the dial is in the coffee pour position. Therefore, mechanical valve machines must rely on the user to stop the flow of water.

Mechanical valves typically have three positions: off (or standby/ready), coffee pour, and steam/hot water. The selection of steam/hot water is often made with a separate button or selector to toggle between steam and hot water. As noted above, both steam and hot water are often dispensed from the steam wand. The primary difference between these two functions is the thermoblock temperature and the pump's duty cycle. For example, the thermoblock temperature for steam may be approximately 140° C., while the hot water temperature may be about 100° C. Similarly, the pump duty cycle for steam may be about 10%, while the duty cycle for hot water may be about 70%.

A further feature possessed by many solenoid machines is an additional valve to release the pressure between the pump, thermoblock, and grouphead (or brewing mechanism). This is required as coffee grinds exert a back pressure on the water volume. If this pressure is not released prior to removing the group handle, the rapid pressure release at the group head can disrupt the wet coffee grounds, which makes a mess. Even if there is no mess, spent coffee grounds will be wetter if the pressure is not relieved prior to removing the grouphandle. Again, this is messier. Mechanical valve machines do not have a pressure relief for the pump to thermoblock to group head plumbing. They often therefore have remnant pressure which leaves a wet coffee cake for the user to remove.

On some espresso machines and other beverage makers, steam wands are used to texture and warm (generally) milk. It is desirable to adjust the steam wand angle and position for different milk texture results, different amounts of milk, user visibility and user preference.

Some current steam wand constructions allow full rotation adjustment with 2 or 3 degrees of freedom. Other constructions allow rotation adjustment about a single axis, i.e. one degree of freedom. The constructions that allow more freedom of movement typically have a spherically machined metal construction affixed by brazing/welding/thread to the steam wand to achieve the freedom of motion. Additional components are often required to be added, such as metal tabs, to limit the motion within the desired range. If the range is not limited the wand can rotate indefinitely. These constructions are complicated, expensive to manufacture, and often become unreliable due to the large number of components and fixings within the sub assembly, to achieve the required functional features.

Wands that do not limit the range of motion within a range and allow free rotation need additional means to separate the wand motion from the plumbing delivering steam to the steam wand from the boiler or thermoblock. Without a means to separate the wand rotation from the plumbing, the plumbing line, which is often of thin flexible Teflon tube, the tubing can get twisted, tangled and kinked.

SUMMARY

In a first aspect of the present invention there is provided an espresso machine comprising: a user interface for selecting a mode of operation; a pump; a water heater in fluid communication with the pump; a flow meter for monitoring a volume of water; and a mechanical valve assembly in fluid communication with the water heater, said mechanical valve assembly including at least two mechanical valves for routing fluid from the water heater, wherein the at least two mechanical valves are selected from: (a) a first valve for selectively opening and closing fluid communication to a brewing mechanism; (b) a second valve selectively opening and closing fluid communication to atmosphere; and (c) a third valve selectively opening and closing fluid communication to a steam wand or hot water outlet.

In a second aspect of the present invention there is provided an espresso machine comprising: a user interface for allowing a user to select a mode of operation from at least one of a standby/ready mode and a coffee brew mode; a pump; a thermoblock in fluid communication with the pump for supplying heated water to a grouphead; a flow meter for monitoring a flow rate of water flowing into the thermoblock; a temperature sensor for monitoring a temperature of the thermoblock; and a controller configured to control power supplied to the thermoblock such that: when the espresso machine is in the standby/ready mode, the power supplied to the thermoblock is controlled based on the temperature of the thermoblock; and when the espresso machine is in the coffee brew mode, the power supplied to the thermoblock is controlled at least partly dependent on a flow rate measured by the flow meter.

In a third aspect of the present invention there is provided a steam wand assembly for an espresso machine, the steam wand assembly comprising: a steam wand tube; and an over moulded ball moulded over the steam wand tube at a location proximate an upper end of the steam wand tube, and a ball receiving assembly defining a socket for receiving the ball, the ball receiving assembly being mountable to an espresso machine to movably secure the steam wand tube to the espresso machine.

In a fourth aspect of the present invention there is provided a method of manufacturing a steam wand assembly for an espresso machine, the method comprising: providing a cylindrical steam wand tube; and over moulding a ball over the steam wand tube at a location proximate an upper end of the steam wand tube.

In an embodiment, an espresso machine is provided that utilizes a valve in addition to a flow meter. This results in a low-cost espresso machine with both espresso pour and steam/hot water outlets, while delivering a measured volume of water for the espresso pour. In this embodiment, the espresso machine utilizes a shared pump and water heater (e.g., a thermoblock, boiler or similar) for multiple functions and/or through different outlets. For example, water from the reservoir may be sent through the flow meter to the pump, then to the water heater, and eventually to either the grouphead or steam wand (or to a pressure release).

In another embodiment, a pressure-relief mode may be initiated after brewing operations, but before the machine fully reverts to its "off" state. A valve may be opened between the machine's grouphead and atmosphere before being closed again for resting in the "off state."

In a further embodiment, a steam wand construction is provided that is applicable to an espresso machine and allows three degrees of rotational freedom. The construction method may reduce the number of parts required to achieve the functional geometry through an overmould process. The construction is generally less expensive, saving machining time and labour assembly costs as the required geometry is achieved through the design detail of the over mould plastic component. By including rotation limits on the plastic overmould; a Teflon tube that plumbs steam directly from the thermoblock (or boiler) can be threaded down the length of the steam wand. By having the steam plumbed down the length of the steam wand in a Teflon tube, this heat of the steam is isolated from the steam wand, which may be constructed from stainless steel, making the steam wand cooler to touch and facilitating comfortable adjustment of the steam wand position.

Various other aspects, objects, features and embodiments of the present disclosure are disclosed with reference to the following specification, including the drawings.

Notwithstanding the above examples, the present disclosure is intended to encompass a variety of other embodiments including for example other embodiments as are described in further detail below as well as other embodiments that are within the scope of the claims set forth herein.

BRIEF DESCRIPTION OF THE DRAWINGS

Embodiments of the disclosure are disclosed with reference to the accompanying drawings and are for illustrative purposes only. The disclosure is not limited in its application to the details of construction or the arrangement of the components illustrated in the drawings. The disclosure is capable of other embodiments or of being practiced or carried out in other various ways. Like reference numerals are used to indicate like components. In the drawings:

FIG. 6A is a front elevation view of a dial for an espresso machine, according to an example embodiment;

FIG. 6B is a chart of component conditions for the system shown in FIG. 1, upon selection of various options via the dial in FIG. 3A;

DETAILED DESCRIPTION

Figure 1:
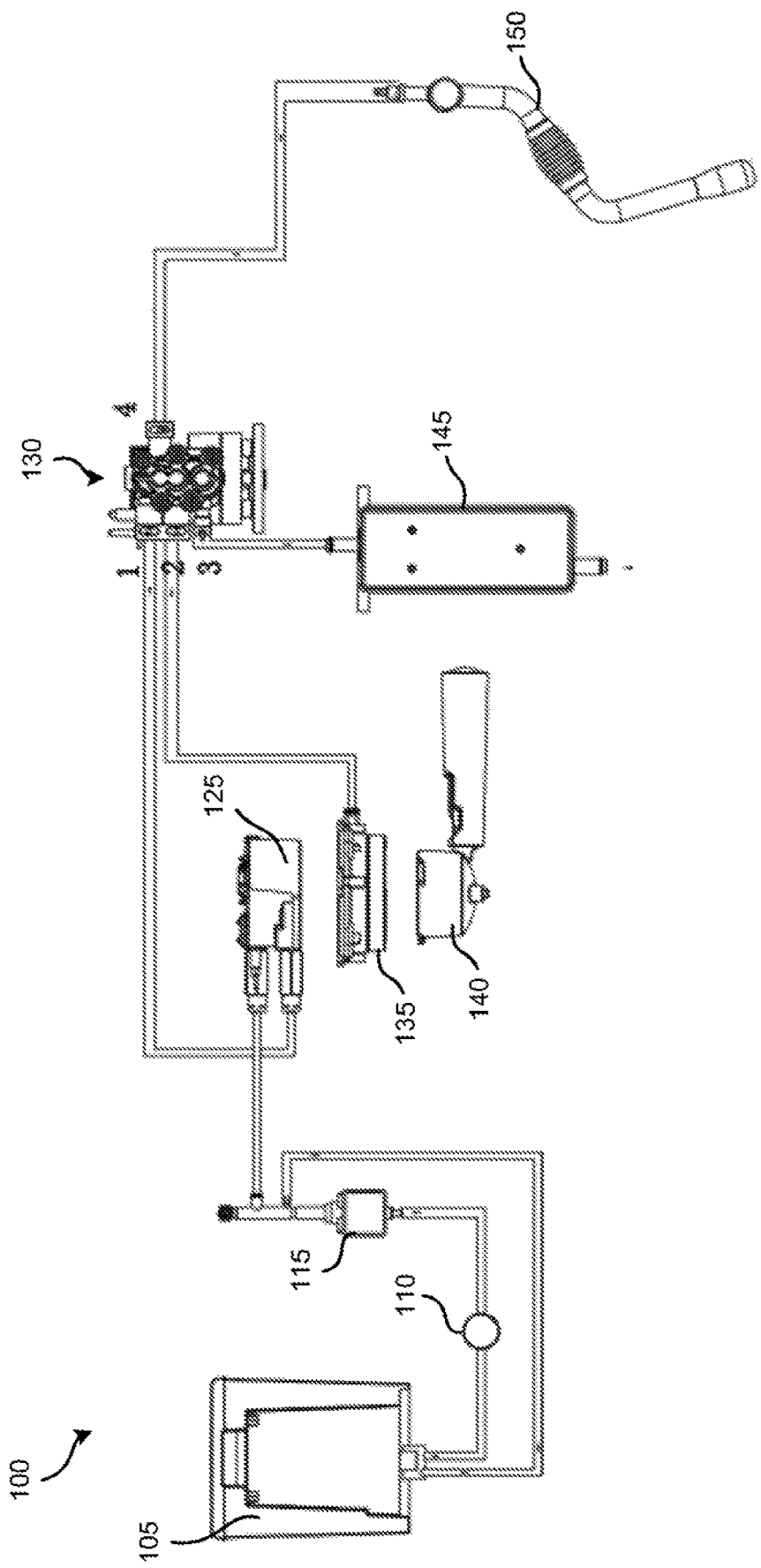
FIG. 1 is an overview flow diagram of components within an espresso machine according to an example embodiment.
Figure 2A:
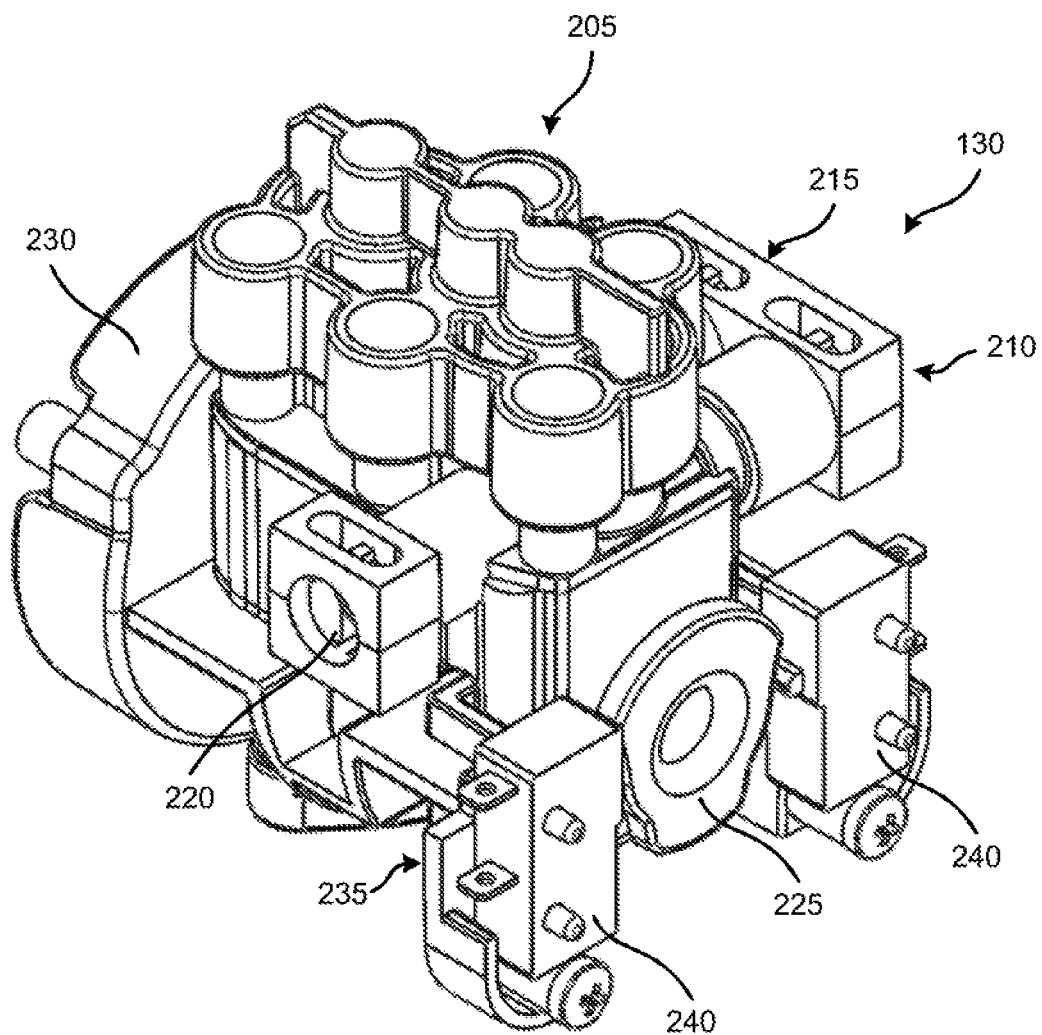
FIG. 2A is a rear perspective view of the valve mechanism of FIG. 1, according to an embodiment.
Figure 2B:
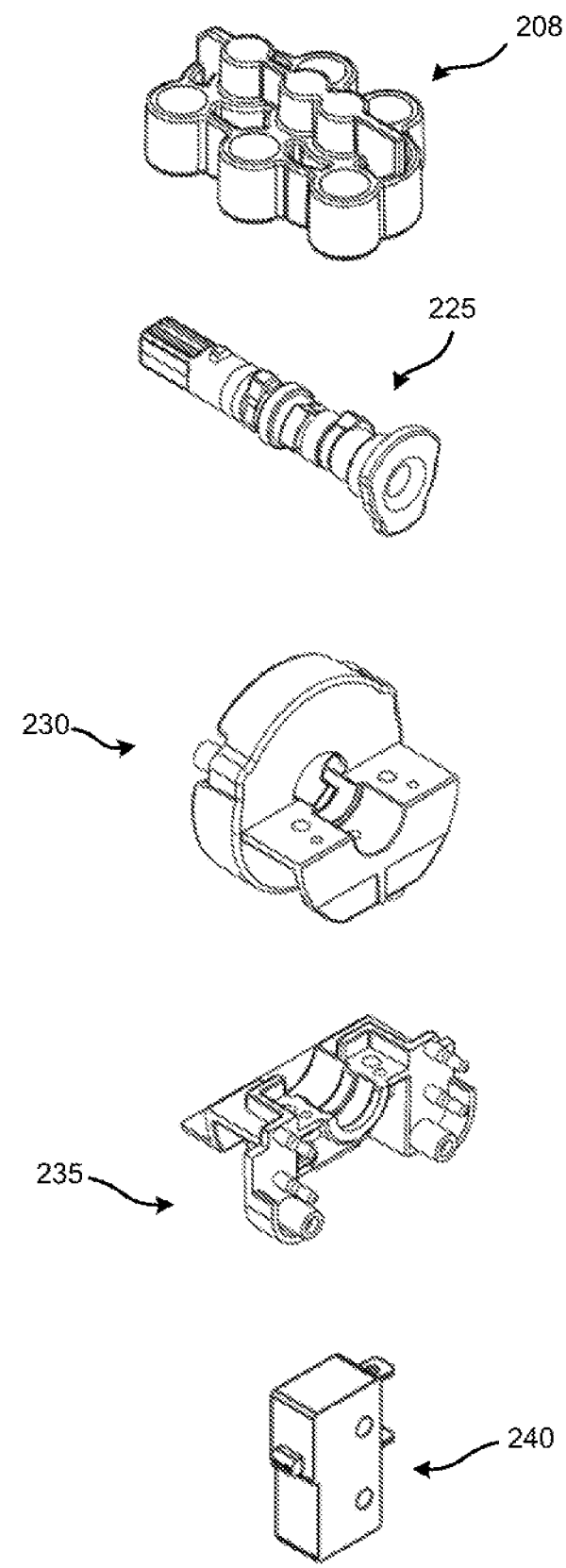
FIG. 2B is a perspective view and parts listing for components of the valve mechanism of FIG. 2A.
Figure 3:
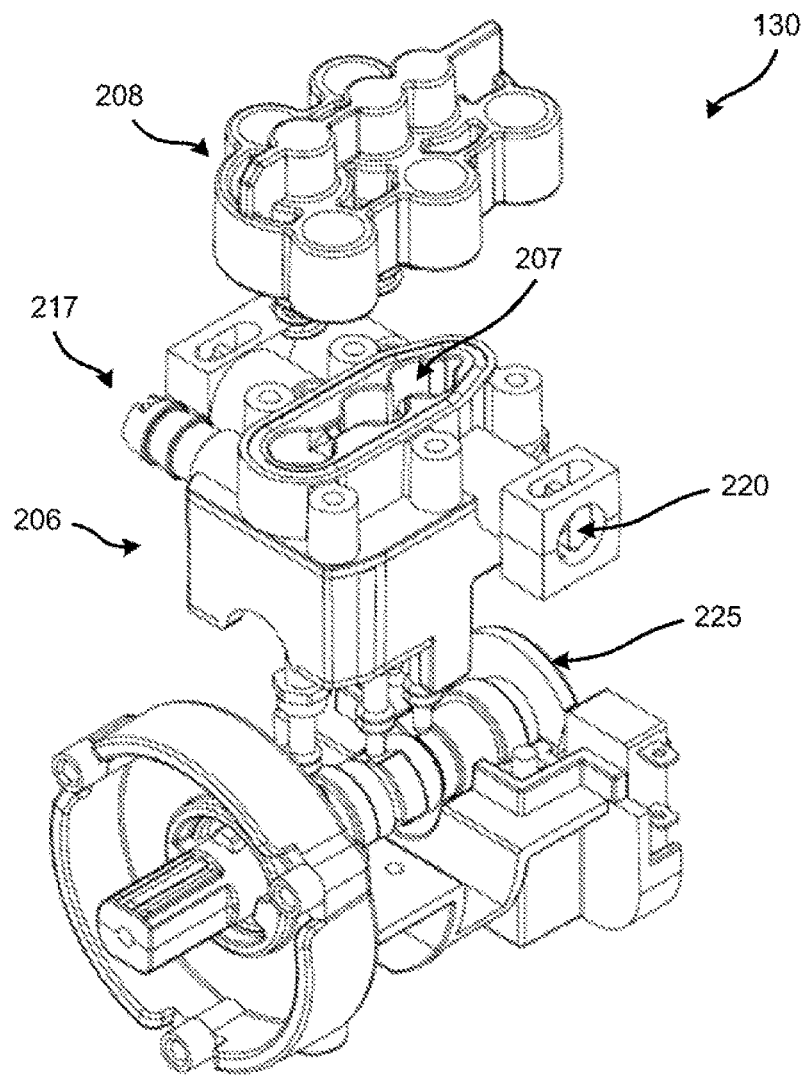
FIG. 3 is an exploded, front perspective view of the valve mechanism of FIG. 2A.
Figure 4:
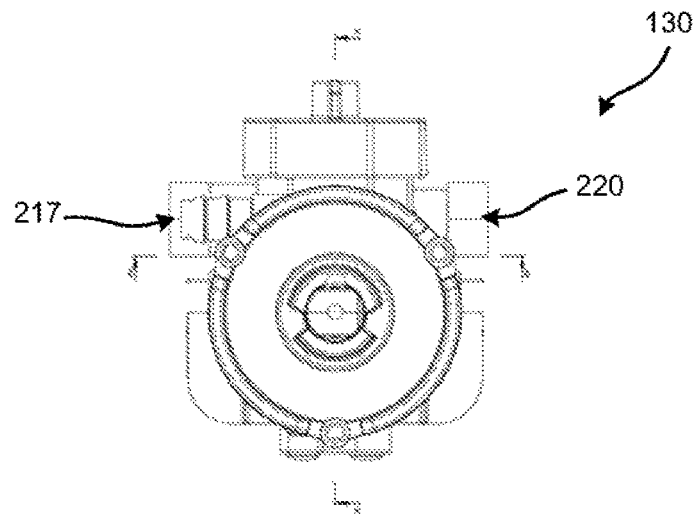
FIG. 4 is a front elevation view of the valve mechanism of FIG. 2A.

FIG. 1 is an overview flow diagram of the components within an espresso machine 100 according to an example embodiment. The espresso machine 100 includes a water reservoir 105. In one embodiment, the water reservoir 105 is in fluid communication with a flow meter 110. Water can flow from the flow meter 110 to a pump 115. In some embodiments, the pump 115 may include a flow-back tube 120 to allow water cycling back to the water reservoir 105 as needed.

From the pump 115, water can be pumped to an input of a water heater 125, in this embodiment a thermoblock, where the water is heated to a desired temperature. Heated water can then flow from an output of the thermoblock 125 to a valve mechanism 130. The valve mechanism 130 may, in an example embodiment, output water to one or more different destinations. For example, the valve mechanism 130 may direct water to a first destination, being the group head (comprised in an embodiment by funnel bracket 135 and funnel arm 140) where coffee is brewed. The valve mechanism may alternatively direct water to a second destination, being a steam baffle and/or drip tray 145, which is effectively a general purpose vent/exhaust for unneeded water and pressure. The valve mechanism 130 may instead also direct water to a third destination, being the steam wand 150, where steam or hot water can be dispensed.

FIGS. 2A to 5B illustrate the valve mechanism 130 in greater detail. As can be seen, the valve mechanism 130 includes a valve block 205. The valve block 205 includes an input 210 for receiving water from the thermoblock 125. In the present embodiment, a first output 215 is shown adjacent to the input 210. The first output directs water to the funnel bracket 135 and funnel arm 140 of the grouphead. A second output 217 (visible in FIG. 2B) is shown adjacent the first output 215, and directs water to the steam baffle and/or drop tray 145. A third output 220 directs steam or hot water to the steam wand 150. A person skilled in the art would appreciate that alternate component layouts can achieve the same outcome.

The valve mechanism 130 also includes a valve cam shaft 225 that is mechanically coupled with the selection user interface such as a dial. The valve cam shaft 225 includes cams along its length, each one associated with a valve within each of the outputs 215, 217, 220. As the valve cam shaft 225 rotates, each of its cams interacts with one of the valves in the outputs 215, 217, 220 to cause opening and closing thereof. This shaft rotation is in an embodiment encoded as an input to a micro-controller. This will be discussed in detail below.

The valve block 205 includes a valve block body 206 and a valve block cover 208, which together define a valve block chamber 207 in constant fluid communication with the input 210 via input aperture 211. The valve block 205 further defines first to third output cylinders 212, 213, 214 that each extend from a chamber opening adjacent the valve block chamber 207 to a respective cam shaft opening proximal the valve cam shaft 225. The first output cylinder 212 is in fluid communication with the first output 215, via a first output aperture 218. The second output cylinder 213 is in fluid communication with the second output 217 via a second output aperture 219. The third output cylinder 214 is in fluid communication with the third output 220 via a third output aperture (not shown). Each output cylinder 212, 213, 214 is in selective fluid communication with the valve block chamber 207 via the chamber opening dependent on operation of the respective valve.

First to third valve tappets 221, 222, 223 are received within the first to third output cylinders 212, 213, 214, respectively, extending from the valve cam shaft 225 into the valve block cover 208. Each valve tappet 221, 222, 223 includes a cam follower end adapted to follow the respective cam on the valve cam shaft 225, and a guide tip end received within a corresponding guide socket defined by the valve block cover 208. One or more O-rings can be provided between each valve tappet 221, 222, 223 and its respective output cylinder 212, 213, 214 at an end proximal the valve cam shaft 225 to form a seal preventing unwanted fluid egress from the output cylinder 212, 213, 214 via the cam shaft opening. Each valve tappet 221, 222, 223 is further provided with a valve seal ring 221A, 222A and 223A positioned in the valve block chamber 207. Each valve seal ring 221A, 222A and 223A is adapted such that, when it is seated against the chamber opening of the respective output cylinder 212, 213, 214, it forms a seal preventing fluid communication between the valve block chamber 207 and the respective output cylinder 212, 213, 214, thereby closing the valve and preventing fluid egress through the respective output 215, 217, 220.

Figure 5B:
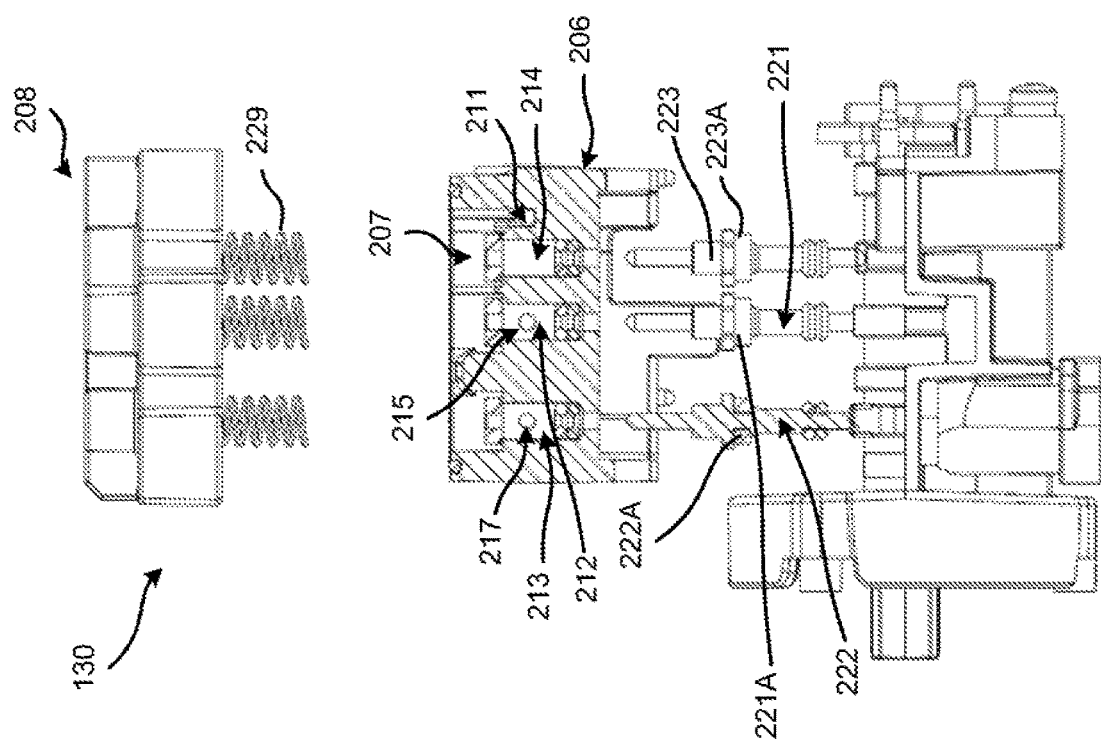
FIG. 5B is an exploded, partial sectional view of the valve mechanism of FIG. taken along the section A-A in FIG. 4.
Figure 5A:
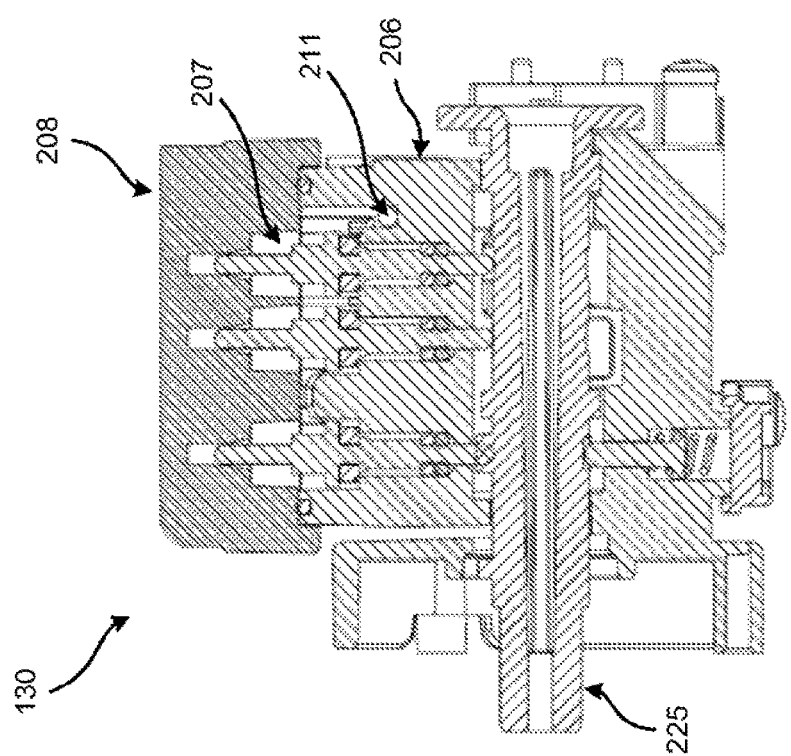
FIG. 5A is a sectional view of the valve mechanism of FIG. taken along the section A-A in FIG. 4.

As shown in FIG. 5B, springs 229 are provided to bias each valve tappet 221, 222, 223 away from the valve block cover 208 and toward the valve cam shaft 225, to seat each valve seal against its respective chamber opening in a valve closed position. As the valve cam shaft 225 rotates, each of its cams interacts with a respective one of the valve tappets 221, 222, 223 to overcome the biasing force of the respective spring, unseat the valve seal from the respective chamber opening and opening the valve to allow fluid communication between the valve block chamber 207 and the respective output 215, 217, 220.

One embodiment of the valve mechanism 130 may also include a valve block mount 230, a valve block switch mount 235, and at least one microswitch 240 mounted on the valve block switch mount 235. As shown in the example embodiment of FIG. 2A, two microswitches 240 are included. The microswitches 240 are arranged around the shaft to encode the rotational position of the shaft, and communicate the position of the dial to the microcontroller. As the shaft rotational position relates directly to the valve porting, the microcontroller can activate the appropriate corresponding function. Microswitches 240 shall be referred to as SW1 and SW2. A person skilled in the art will appreciate that there are other methods to encode the shaft position, such as variable potentiometers and emitter/receiver optical encoders.

FIG. 6A is a front elevation view of a dial 300 for an espresso machine, according to an example embodiment, while FIG. 6B is a chart of component conditions for the system shown in FIG. 1, upon selection of various options via the dial in FIG. 6A. For example, when the dial 300 is in the "off" position 305, both SW1 and SW2 are "off." The valve cam shaft 225 is therefore rotated such that the valve for the second output 217 (to the steam baffle and/or drop tray 145) is the only open valve. Thus, the thermoblock 125 is connected directly to atmosphere. The pump 115 is turned off, and the temperature of the thermoblock 125 is preheated to and held at a suitable brewing temperature (which may, in an example embodiment, be about 93° C.).

However, when the dial 300 is turned from the "off" position 305 to the "1 Cup" position 310, SW1 flips to "on" while SW2 remains "off." This rotation of the valve cam shaft 225 is such that the second output 217 is closed while the first output 215 is opened. In this same position, the pump 115 is turned on until the flow meter 110 detects that sufficient water for one cup of espresso has been dispensed (which may, in an example embodiment, be 30 mL). The thermoblock 125 remains at a coffee brewing temperature, thereby heating the water appropriately. In another example embodiment, moving the dial 300 further to the "2 Cup" position 315 results in both SW1 and SW2 flipping to "on." The remaining components remain in the same general configuration, except for the flow meter 110 which monitors for two cups worth of water (which may, in an example embodiment, be 60 mL).

When the dial 300 is moved back to the "off" position 305 from either the "1 Cup" or "2 Cup" position 310, 315, it passes by an intermediate portion 320 which may be unmarked to the user, in an example embodiment. At this intermediate portion 320, both SW1 and SW2 flip back to off, and the valve cam shaft 225 rotates back to a position in which the first output 215 is closed and the second output 217 is open (i.e. an "off" configuration). However, before reaching such an "off" configuration, the valve cam shaft 225 rotates into an intermediate position in which both the first and second outputs 215, 217 are open at the same time. This allows pressure to vent from the group head to the atmosphere, before the first output 215 is closed.

When the dial 300 is turned from the "off" position 305 to the "steam" position 325, SW2 flips to "on" while SW1 remains "off." The valve cam shaft 225 rotates to close the second output 217 and open the third output 220 which leads to the steam wand 150. There may be a delay in water output while the thermoblock 125 heats to a temperature suitable for steam (which may, in an example embodiment, be about 160° C.). Once the thermoblock 125 is heated, the pump is turned to a lower level duty cycle (which may, in an example embodiment, be about 20%). In another example embodiment, moving the dial 300 further to the "hot water" position 330 results in both SW1 and SW2 flipping to "on." The remaining components remain in the same general configuration, excluding the thermoblock 125 which heats only to a hot water temperature (which may, in an example embodiment, be about 110° C.), and the duty cycle of the pump 115 which is raised from that of steam (which may, in an example embodiment, be about 50%). Again, if this position is chosen immediately from the "off" position 305, it would be reasonable to expect that there may be a delay as the thermoblock 125 heats.

It is noted that both the "2 Cup" position 315 and the "hot water" position 330 cause both SW1 and SW2 to flip "on." In an embodiment, the system preferably includes logic sufficient to determine which is appropriate based on the previous position of the dial 300 and the states of SW1 and SW2. For example, if SW1 and SW2 reach an on/on state immediately after being in an on/off state, the system would understand that the dial 300 has been turned to the "2 Cup" position 315 because it was in the "1 Cup" position 310 immediately prior. On the other hand, if SW1 and SW2 reach an on/on state immediately after being in an off/on state, the system would understand that the dial 300 has been turned to the "hot water" position 330 because it was in the "steam" position 325 immediately prior.

Figure 7:
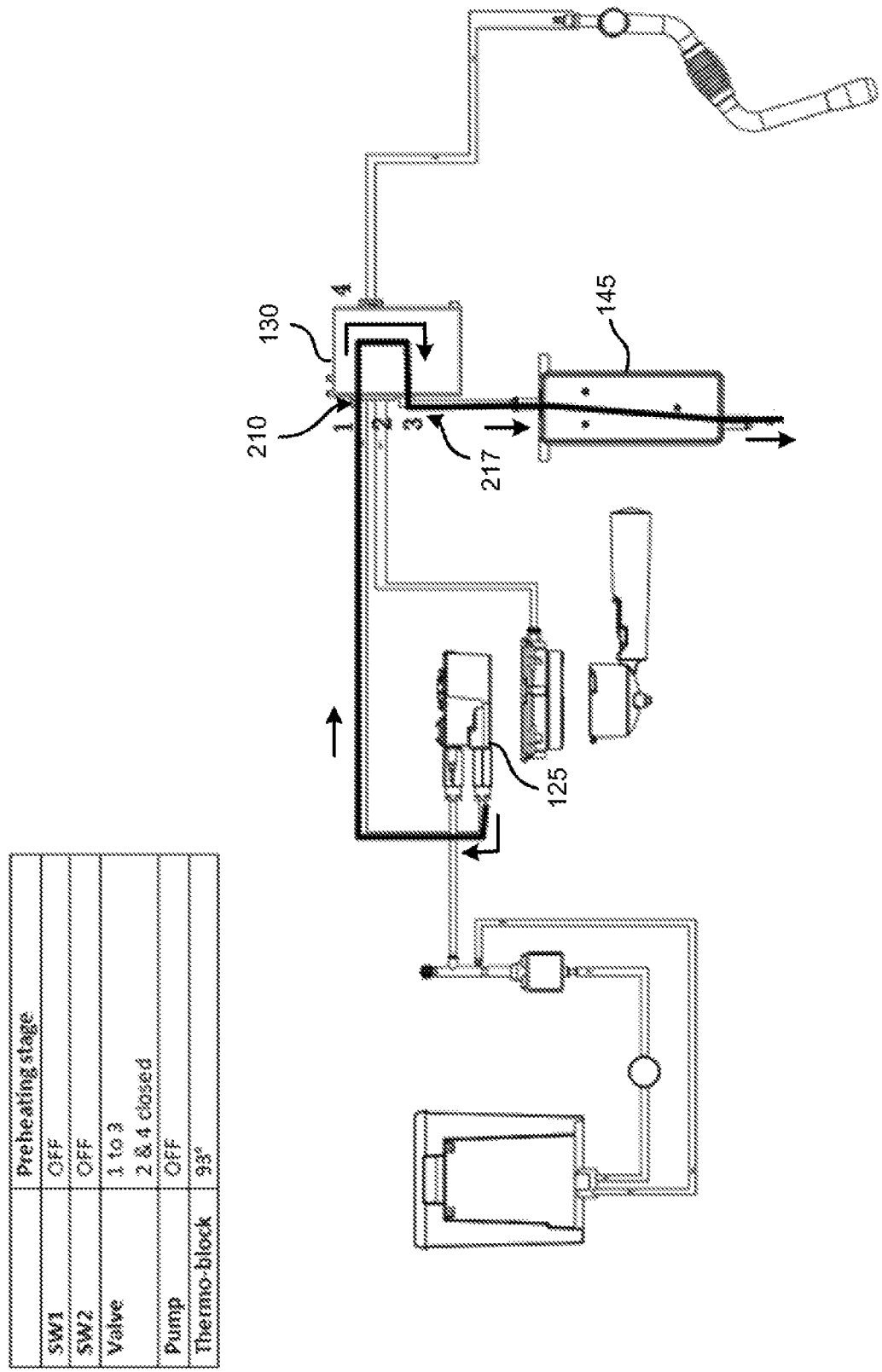
FIG. 7 is a flow diagram showing a preheating stage, according to an embodiment.

FIGS. 7-11, which illustrate flow through the espresso machine 100 in various states, will now be discussed. FIG. 7 illustrates a preheating stage, such as when the espresso machine 100 is in the "off" position 305. In this state, the thermoblock 125 is preheated to a temperature appropriate for brewing coffee. The output of the thermoblock 125 is connected by valve mechanism 130 to the atmosphere (through the second output 217) to exhaust the pressure built up due to the heating of the thermoblock 125.

Figure 8:
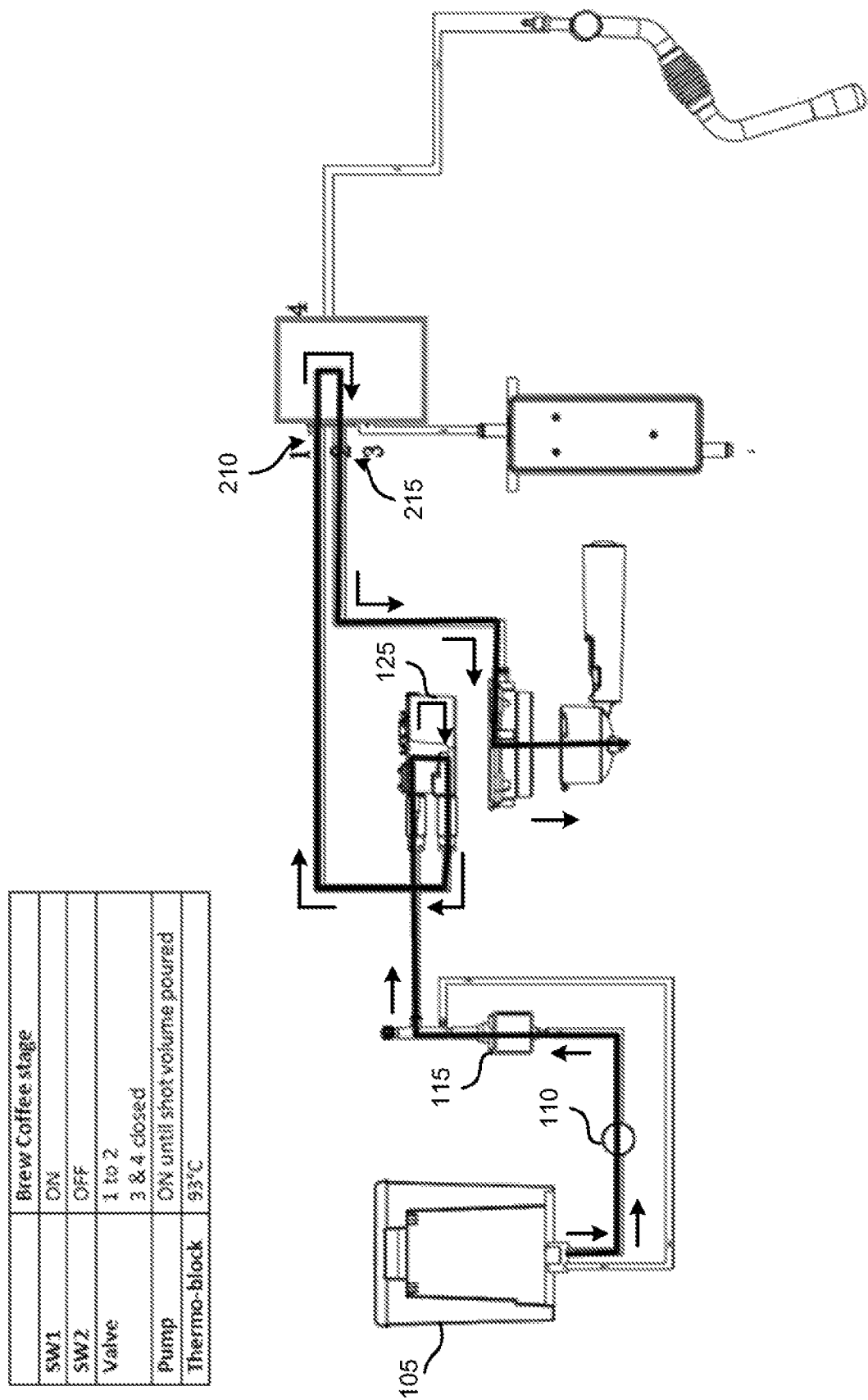
FIG. 8 is a flow diagram showing a coffee brewing stage, according to an example embodiment.

FIG. 8 illustrates a brew coffee stage, which can either be the "1 Cup" or "2 Cup" option discussed above. In this state, water is pumped from the reservoir 105 through the flow meter 110 and to the thermoblock 125 by a pump 115. After being heated in the thermoblock 125, water is pumped to the valve mechanism 130, which passes the water to the grouphead through the first output 215. The pump 115 shuts down after a predetermined amount of water has passed through the flow meter 110.

Figure 9:
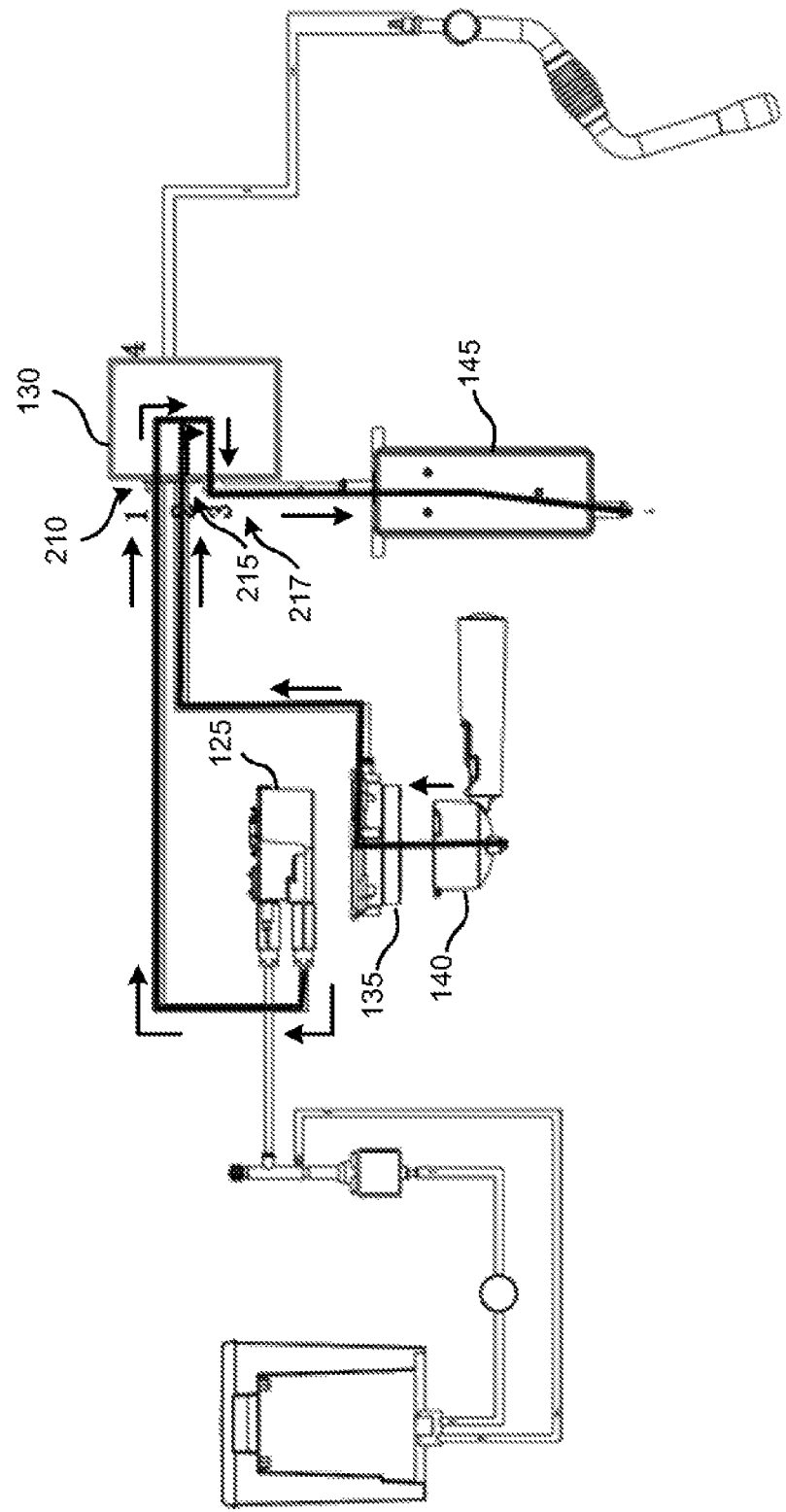
FIG. 9 is a flow diagram showing an intermediate dump stage, according to an example embodiment.

FIG. 9 illustrates an intermediate dump stage, as the dial 300 is turned back from one of the brew stages 310, 315 back to the "off" position 305. When the dial 300 passes the intermediate point 325, water is no longer being pumped from the reservoir 105 through the flow meter 110 and to the thermoblock 125 by the pump 115. The valve mechanism 130 keeps the first output 215 to the grouphead open, but also opens the second output 217. This allows any excess pressure from the grouphead and/or from the thermoblock 125 to vent to the atmosphere. The espresso maker 100 then shifts back to the "off" position shown in FIG. 7. It is noted that the intermediate dump stage described herein could be present on an espresso machine that lacks a flow meter 110 (and thereby the auto-dosing functionality), and vice versa.

Figure 10:
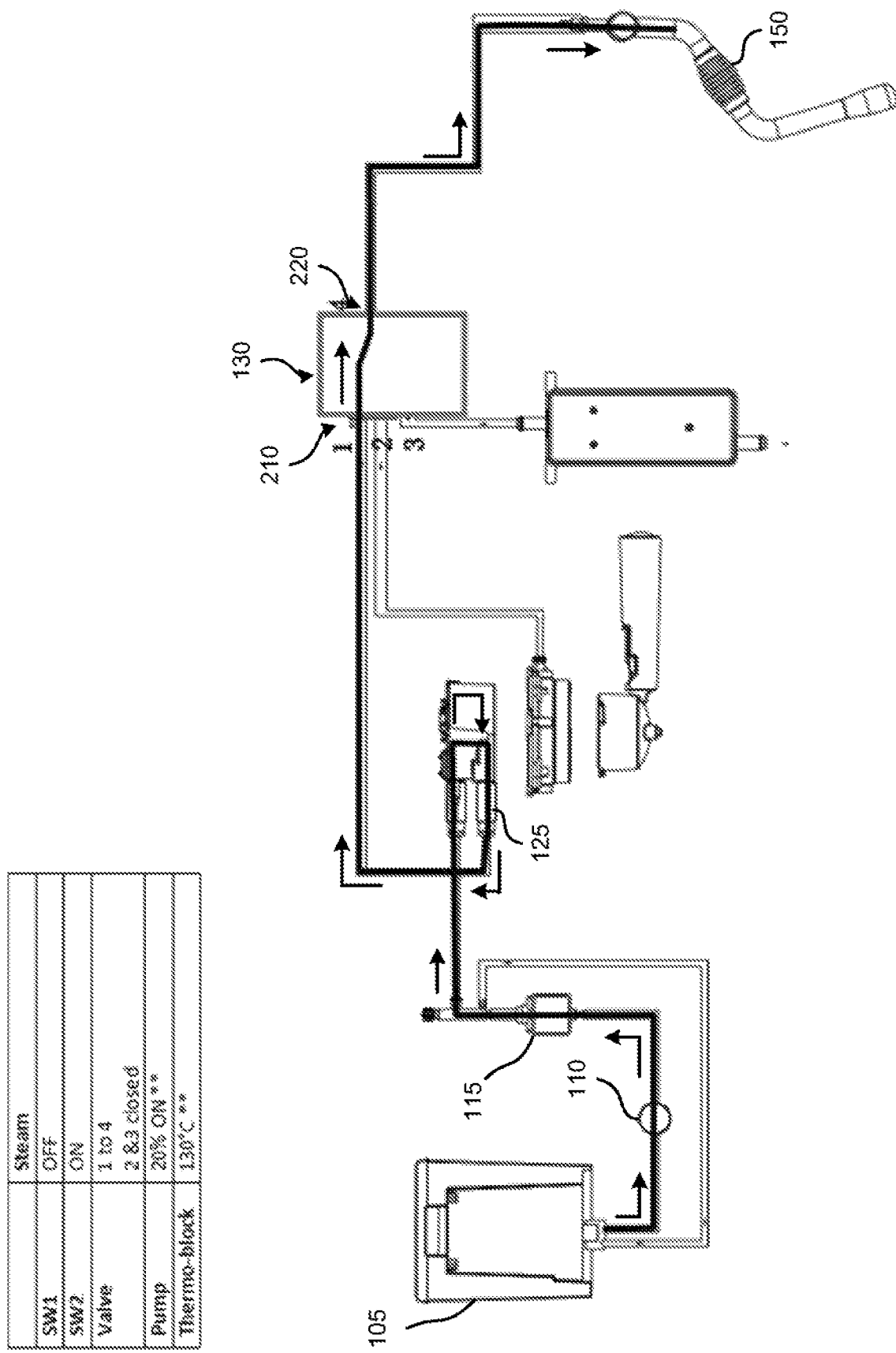
FIG. 10 is a flow diagram showing a steam stage, according to an example embodiment.
Figure 11:
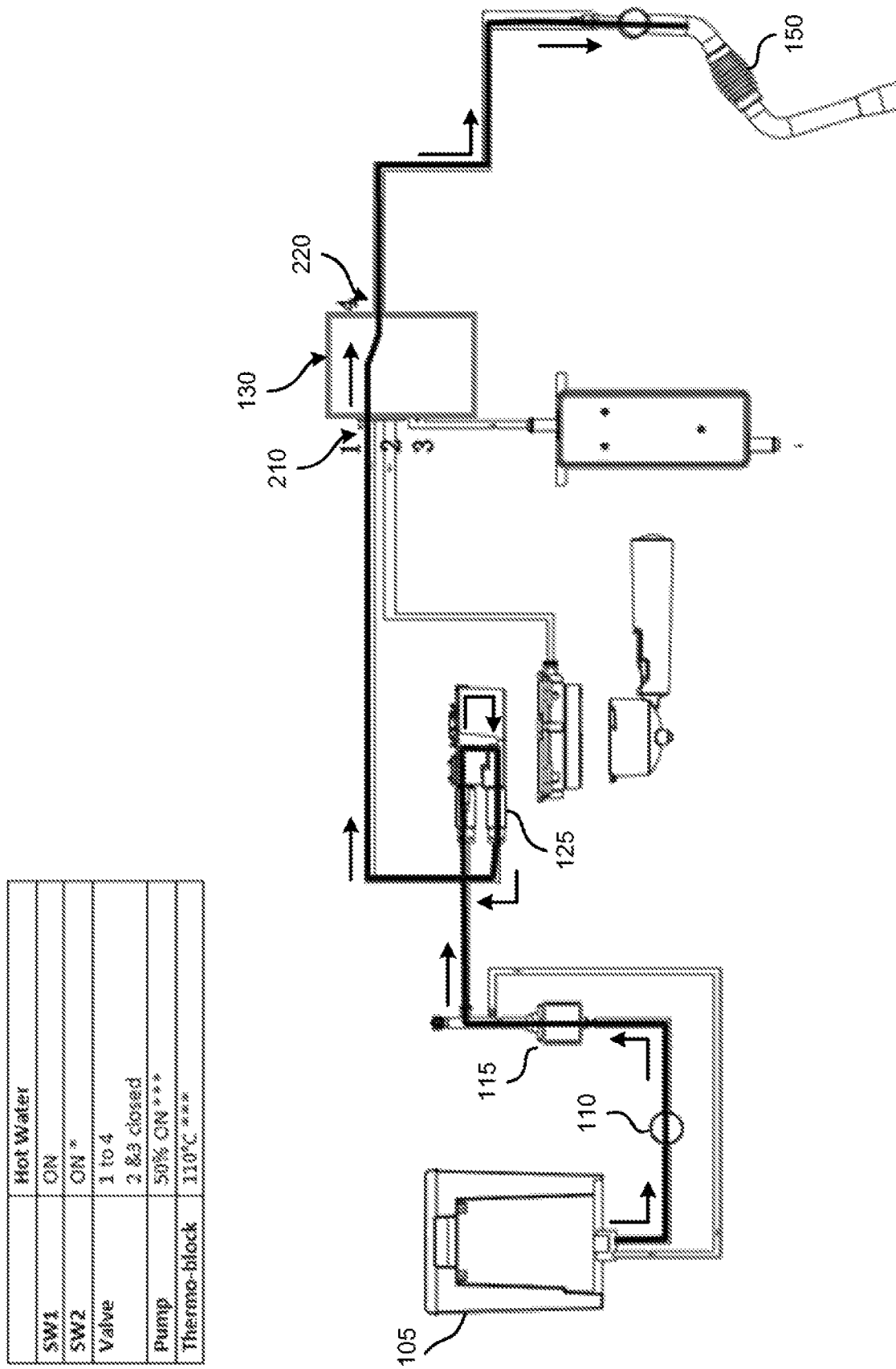
FIG. 11 is a flow diagram showing a hot water stage, according to an example embodiment.

FIGS. 10 and 11 illustrate steam and hot water stages. The flow diagrams are similar between the two, with only the temperature of the thermoblock 125 and the duty cycle of the pump 115 differing (as discussed above). In these states, water is pumped from the reservoir 105 through the flow meter 110 and to the thermoblock 125 by the pump 115. After being heated in the thermoblock 125 to the respective temperature, water is pumped to the valve mechanism 130, which passes the water to the steam wand 150 through the third output 220. Such water distribution may similarly be limited in volume by the flow meter, as discussed above in connection with the brewing of espresso.

In another aspect of the invention, espresso machines with a flow meter can monitor the instantaneous water flow going into the thermal block. If the temperature of the water going into the thermo-block is known, and the heat transfer efficiency characteristics of the thermoblock heat-exchanger are known, and the target temperature for extraction is given (93° C.) then the required input power to the thermoblock can be determined. This configuration is given: water tank>flow meter>temperature sensor>thermoblock> (valves)>grouphead. (Note the flow meter can be anywhere in the water flow path, and the temperature sensor can be anywhere in the water flow path upstream of the thermoblock).

Alternatively if the inlet water temperature is not measured directly, but estimated (or even assumed), then reasonable results can still be achieved. This configuration is given: water tank>flow meter>thermoblock>(valves) >grouphead.

Figure 12:
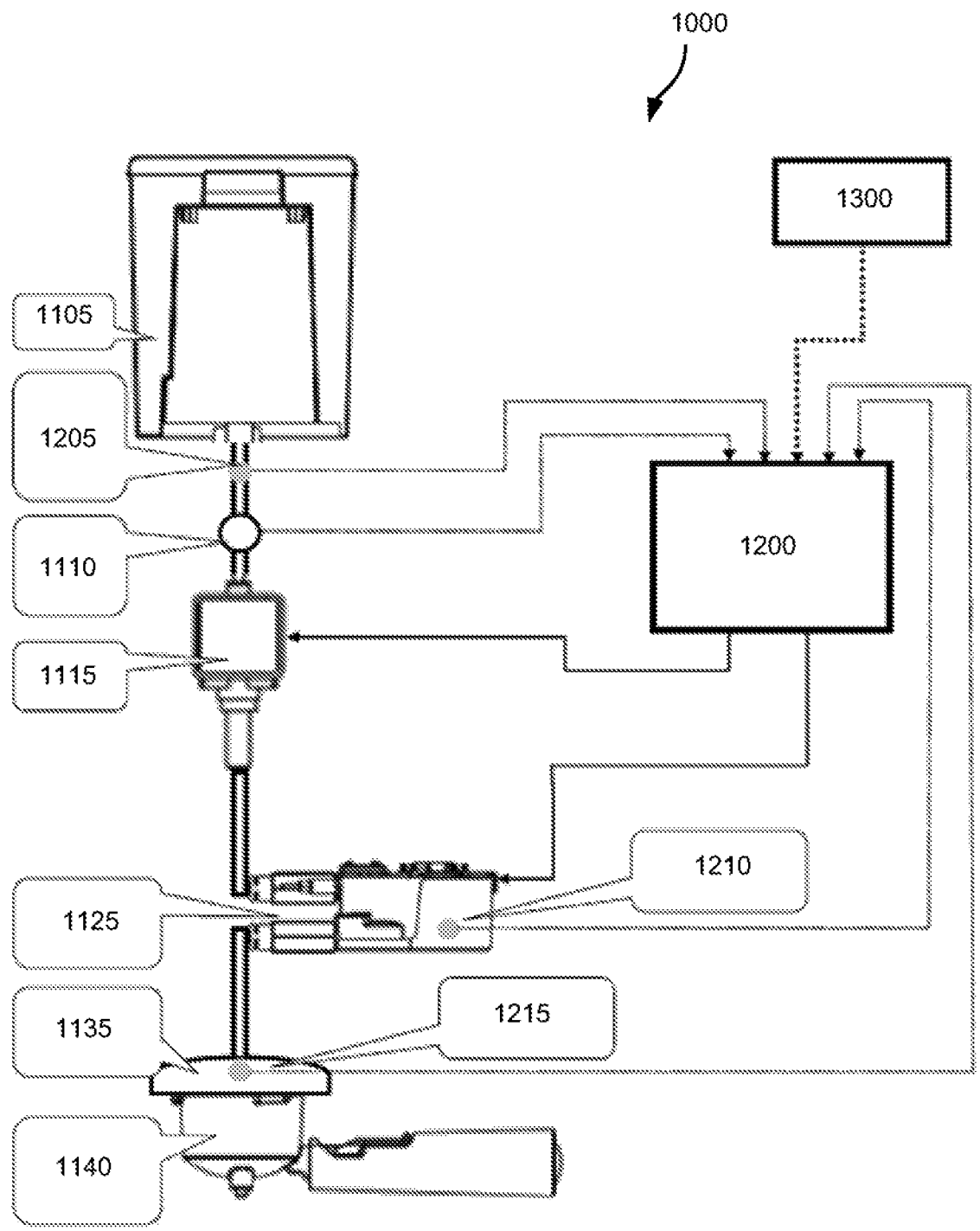
FIG. 12 is a flow diagram showing complete simplified system layout.

FIG. 12 shows the complete simplified* system layout 1000 (*note the valve arrangement is not shown, as this is applicable to any number of different valve arrangements). The system 1000 defines a water path from a reservoir 1105 through a flow meter 1110, a pump 1115 and a thermoblock 1125 to a grouphead 1135. A coffee filter basket 1140 is detachably attached to the grouphead 1135. This system 1000 has three temperature sensors positioned along the water path: 1) input water temperature sensor 1205, 2) thermoblock temperature sensor 1210, and 3) grouphead water temperature sensor 1215. A controller 1200 is provided to control power supplied to the pump 1115 and the thermoblock 1125. A user interface 1300 for allowing a user to select a mode of operation, e.g. between a standby/ready mode and a coffee brew mode, the flow meter 1110 and the temperature sensors 1205, 1210, 1215 are inputs to the controller 1200, with outputs to the pump 1115 and thermoblock 1125.

Figure 13:
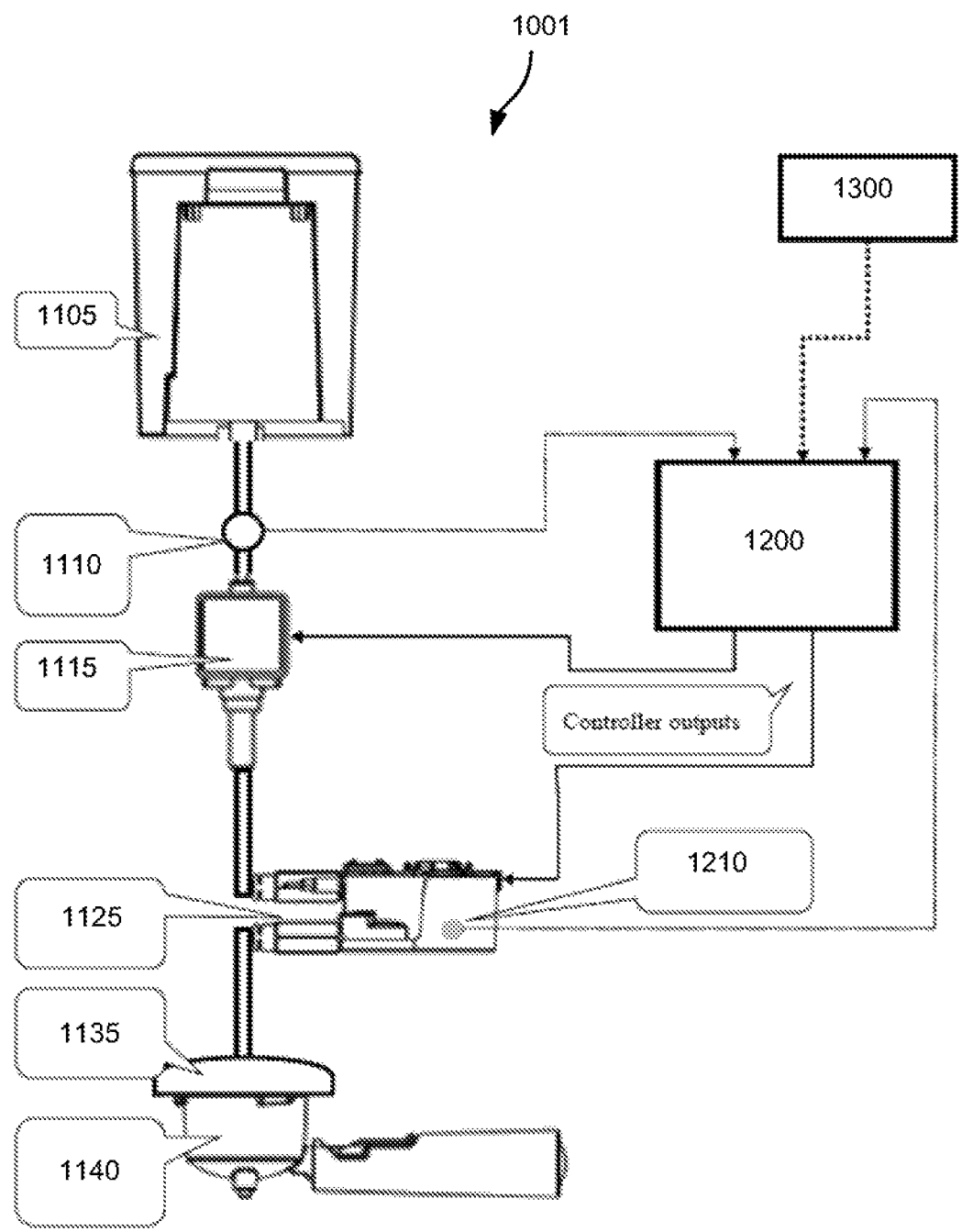
FIG. 13 is a flow diagram showing a minimal system layout with only one temperature sensor on the thermoblock.

FIG. 13 shows the minimal system layout 1001 with only one temperature sensor 1210 on the thermoblock 1125. In other words, this system 1001 is identical to the previous system 1000, apart from the omission of the input water temperature sensor 1205 and the grouphead water temperature sensor 1215. In one embodiment, this system 1001 assumes the inlet water temperature is approximately 24° C., "room temperature".

Figure 14:
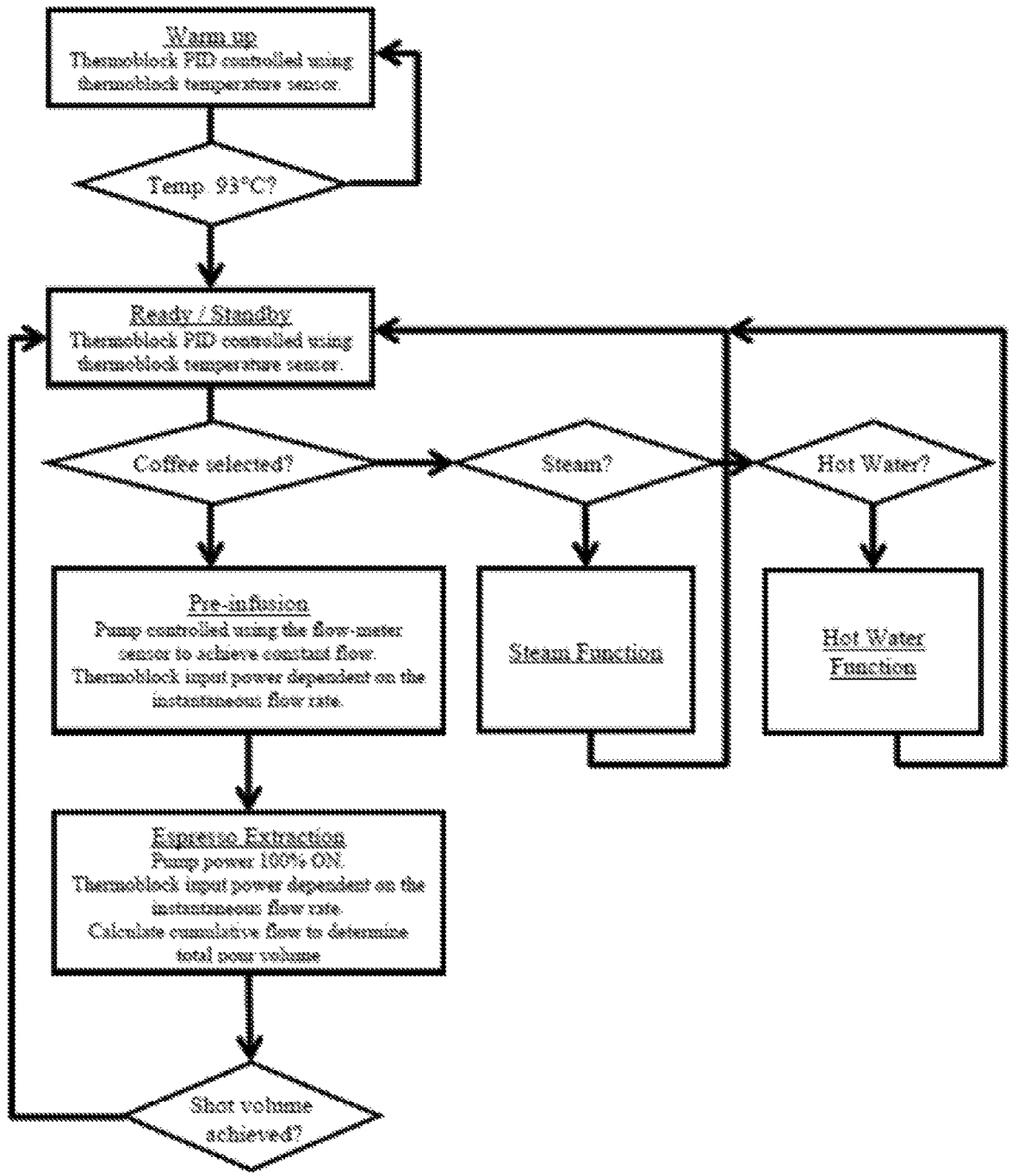
FIG. 14 is a control flow algorithm for minimal system layout.

FIG. 14 shows the control flow algorithm. During the Ready state, the thermoblock temperature is maintained at the ideal coffee extraction temperature (93° C. in this example). Once the espresso pour is initiated, the pre-infusion starts and the pump power is modulated using a phase controller to achieve a constant flow rate. In another embodiment, the pump power during pre-infusion is predetermined. Whether the pump power is modulated or predetermined, the thermoblock power is determined based on the flow rate measured by the flow meter 1110. After the pre-infusion, the coffee extraction cycle starts; the pump is 100% ON while the thermoblock power is still determined by the instantaneous flow rate. Upon achieving the shot volume, (or if the shot is manually stopped by the user) the extraction and the pump 1115 stop. The machine returns to the Ready/Standby mode.

Figure 15:
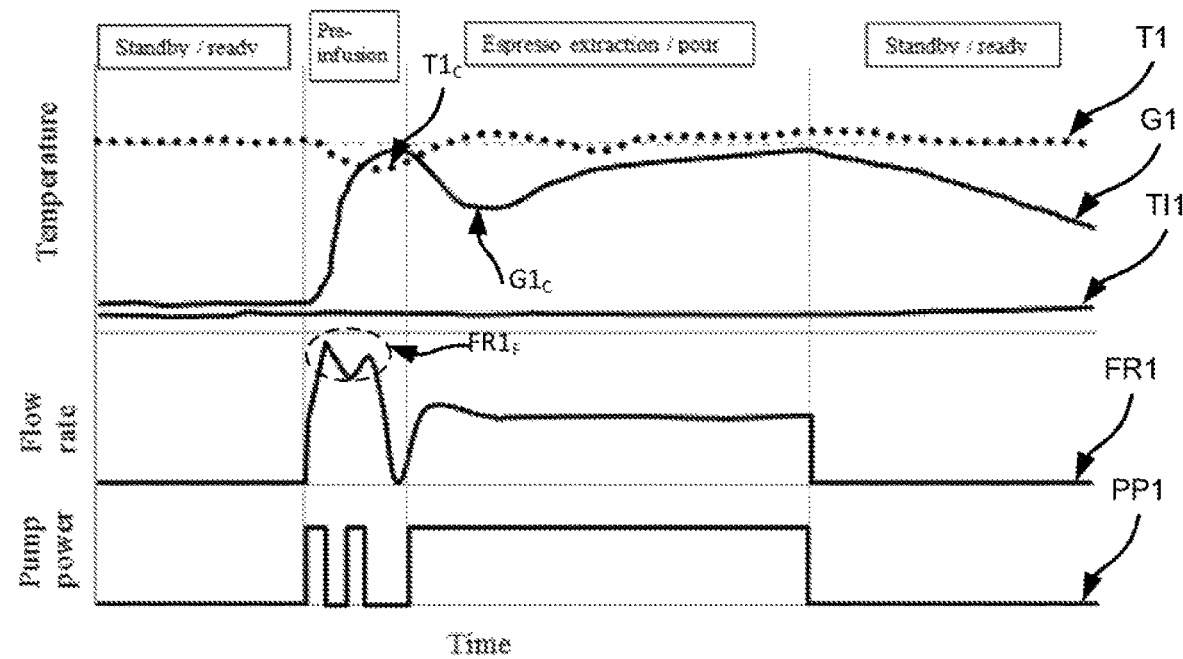
FIG. 15 shows temperature/flow rate/pump power of a known PID temperature controller system.

FIG. 15 shows temperature/flow rate/pump power of a known PID temperature controller system, where the thermoblock temperature T1 is controlled by sensing the thermoblock temperature T1, the pump power PP1 is predetermined, and tank/inlet temperature TI1 remains relatively constant throughout. The temperature response of the thermoblock 1125 is slow to react to the load of the water through the thermoblock, as is shown at $T1_C$, and the resultant temperature G1 of the water at the grouphead is low as a result of the slow temperature response, as can be seen at $G1_C$.

This is further compounded by the high flow rate of the pre-infusion stage at $FR1_F$, while the pump is under full power, because the fast rush of water through the thermoblock 1125 during pre-infusion does not allow enough time for the water flowing through the thermoblock 1125 to be heated, as can be seen at $T1_C$. The grouphead temperature G1 is cold for a substantial portion of the extraction time as a result, as is shown at $G1_C$. The thermoblock temperature G1 is shown as dotted to indicate that this measurement is used as the controller input for the thermoblock 1125.

Figure 16:
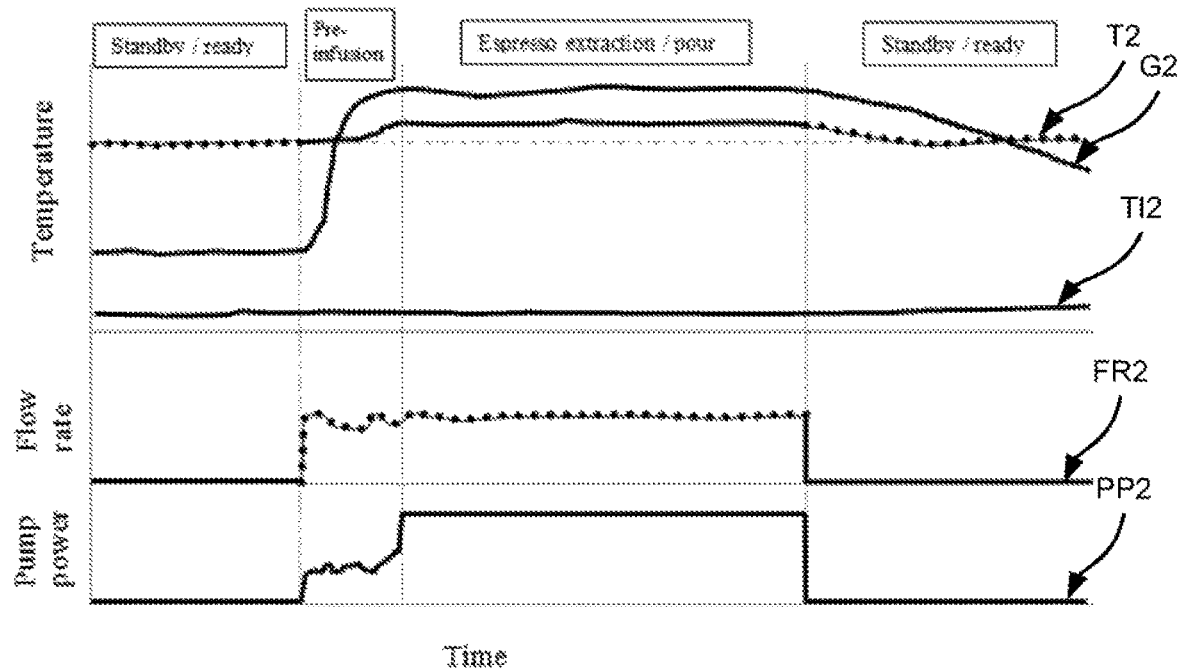
FIG. 16 shows the temperature/flow rate/pump power of one embodiment of the new control method.

FIG. 16 shows the temperature/flow rate/pump power of the new control method according to an embodiment of the present invention. The thermoblock temperature T2 is controlled during standby and is maintained at the ideal coffee extraction temperature of 93° C. for example, i.e. the power supplied to the thermoblock 1125 is controlled based on the thermoblock temperature T2. Upon the start of the coffee cycle, in the pre-infusion stage the flow rate FR2 as measured at the flow meter 1110 is used to control both the thermoblock power and the pump power PP2. In other words, during the pre-infusion stage, the power provided to both the thermoblock 1125 and the pump 1115 is controlled at least partly dependent on the flow rate FR2 measured by the flow meter 1110, as illustrated by the dotted line. During the espresso extraction pour the flow rate FR2 is again used to determine the thermoblock power, but the pump 1115 is now set to 100% power ON. The resultant grouphead temperature G2 is very stable and precise giving reliable extraction performance. The control "hand-over" from thermoblock temperature T2 to flow-rate FR2 is indicated in FIG. 13 with the dotted line.

Figure 17:
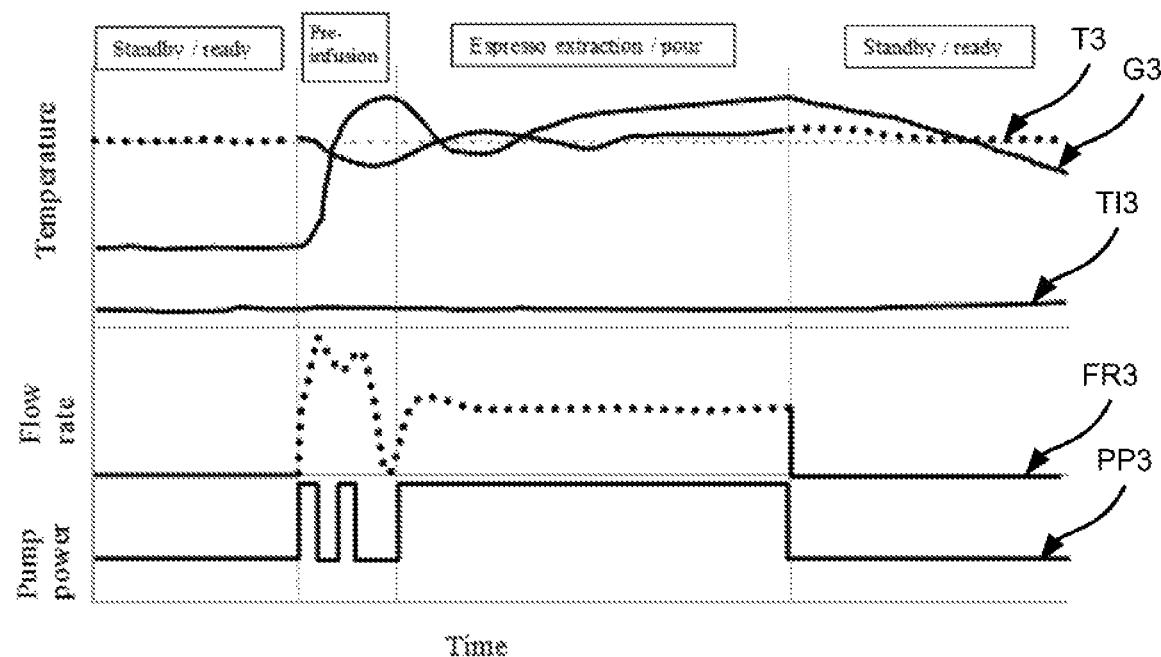
FIG. 17 shows the temperature/flow rate/pump power of another embodiment of the new control method.

FIG. 17 shows the temperature/flow rate/pump power of the new control method according to another embodiment of the present invention. The thermoblock temperature T3 is controlled during standby and is maintained at the ideal coffee extraction temperature of 93° C. for example, i.e. the power supplied to the thermoblock 1125 is controlled based on the thermoblock temperature T3. Upon the start of the coffee cycle, in the pre-infusion stage the flow rate FR3 as measured at the flow meter 1110 is used to control the thermoblock power, and the pump power PP3 is predetermined. In other words, during the pre-infusion stage, the power provided to the thermoblock 1125 is controlled at least partly dependent on the flow rate FR3 measured by the flow meter 1110, as illustrated by the dotted line. During the espresso extraction pour the flow rate FR3 is again used to determine the thermoblock power, and the pump 1115 is now set to 100% power ON. The resultant grouphead temperature G3 is very stable and precise giving reliable extraction performance. The control "hand-over" from thermoblock temperature T3 to flow-rate FR3 is indicated in FIG. 14 with the dotted line.

A person skilled in the art will appreciate that a user interface for the espresso machine may be a dial, touch screen, button or knob among other user interface systems.

Figure 18:
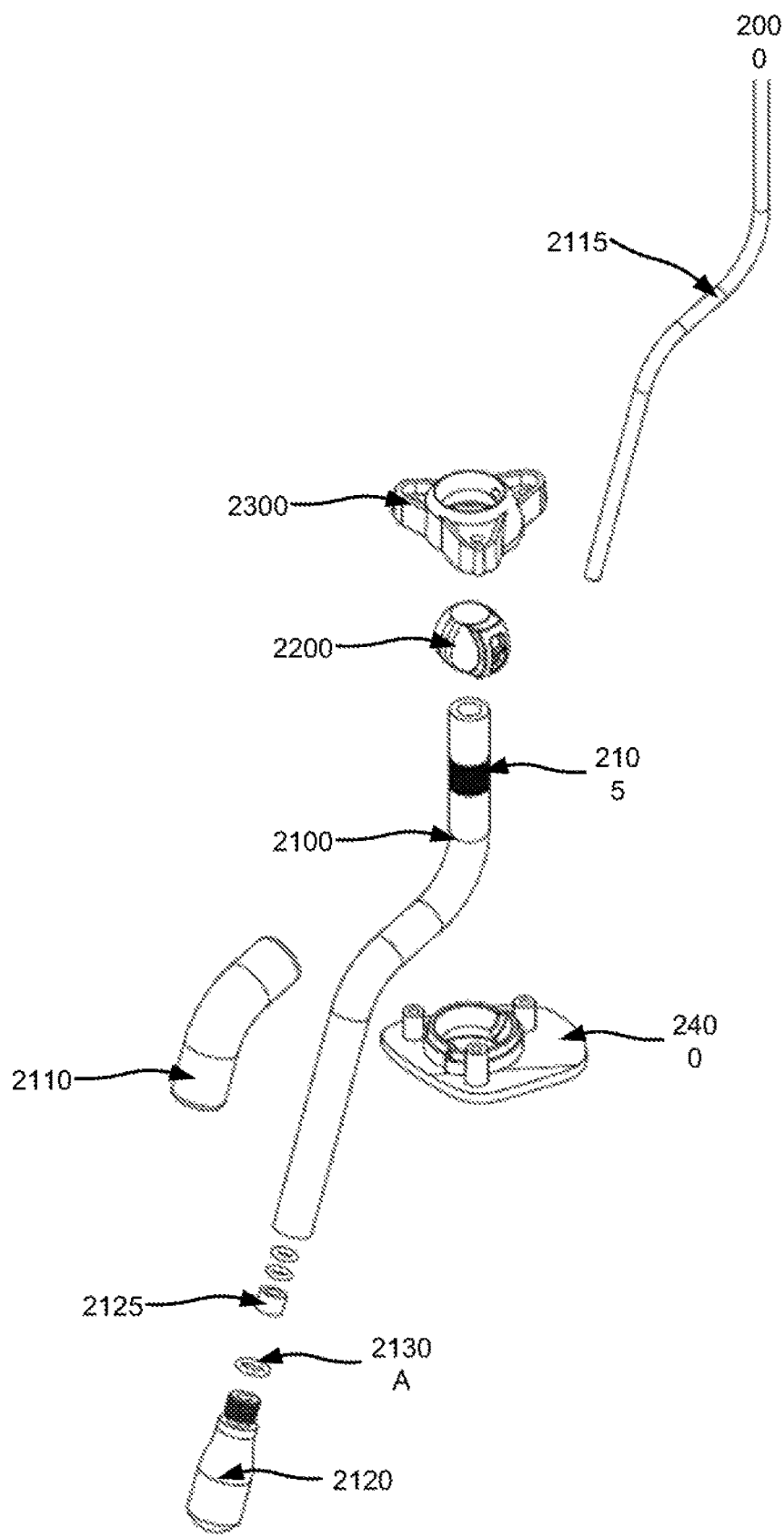
FIG. 18 shows an exploded view of the components of the steam wand according to an example embodiment.
Figure 19:
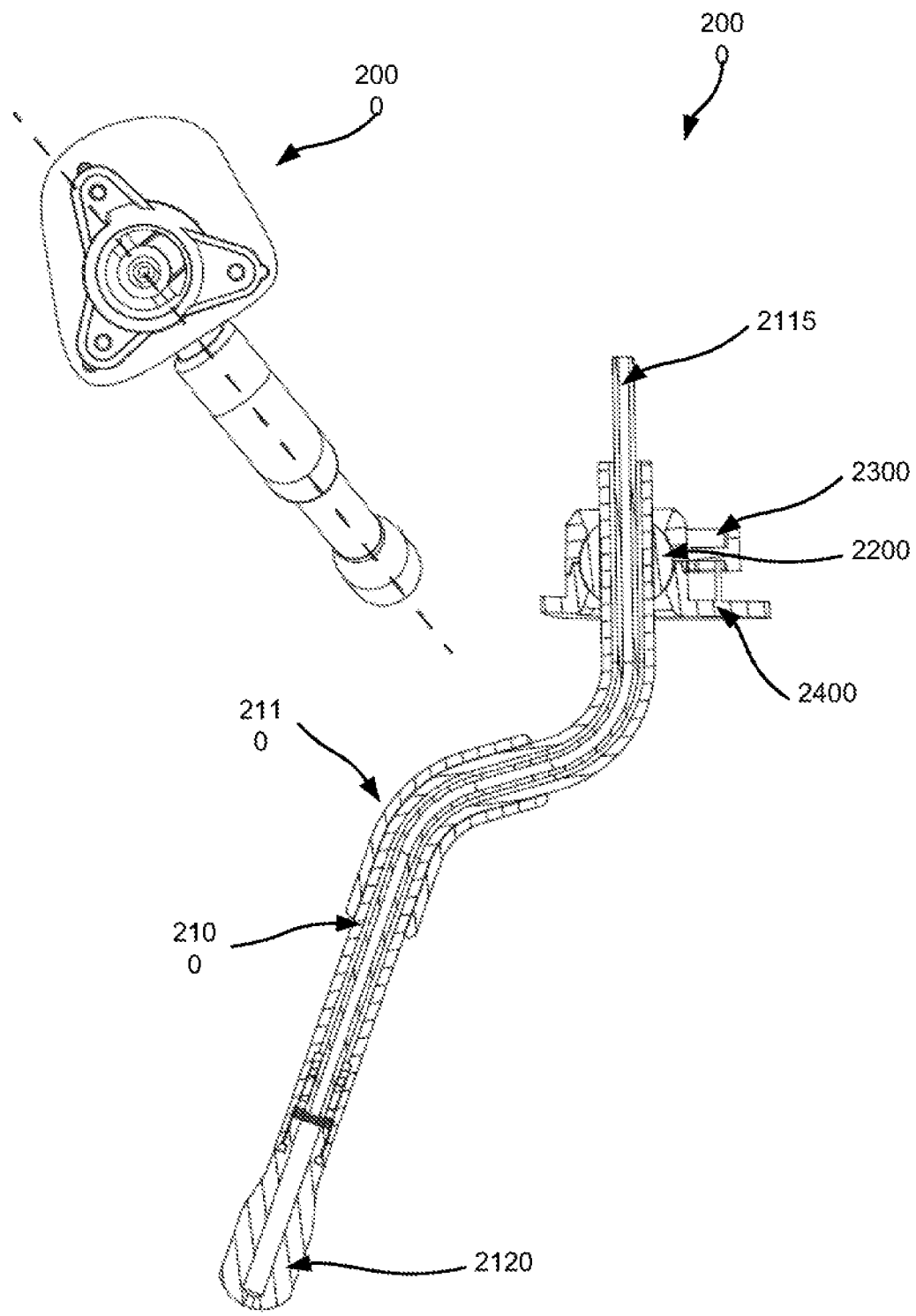
FIG. 19 shows an assembly section view of the steam wand construction.

Another aspect of the invention is embodied in the steam wand assembly 2000 for an espresso machine, as depicted in FIGS. 18 to 22. As shown in FIG. 18, the steam wand assembly 2000 comprises a steam wand tube 2100 and an over moulded ball 2200, which is moulded over the steam wand tube 2100 at a location proximate an upper end of the steam wand tube 2100. A housing 2300 and a bracket 2400 combine to provide a ball receiving assembly that defines a socket for receiving the ball 2200. The ball receiving assembly is mountable to an espresso machine to movably secure the steam wand tube 2100 to the espresso machine. As shown in FIG. 19, inner flexible steam tubing 2115 extends through the steam wand tube 2100, from an opening in the upper end to a steam tube tip 2120 at a lower end.

The steam wand tube 2010 is stainless steel and has a knurled or textured section 2105 towards the top of the steam wand tube 2010. This knurled or textured section 2105 keys the over moulded ball 2200 to the tube 2010. The ball is engineering grade, hard, low friction plastic, and in this embodiment is polyoxymethylene (POM/Acetyl). The ball 2200 is substantially spherical to allow free rotation in any plane around its center when it is assembled and encased in the housing 2400 and bracket 2300. A grip 2110 is provided at a bent section of the steam wand tube 2100, located substantially in the middle of said tube 2100, to assist a user with gripping and manipulating the tube 2100.

Figure 20:
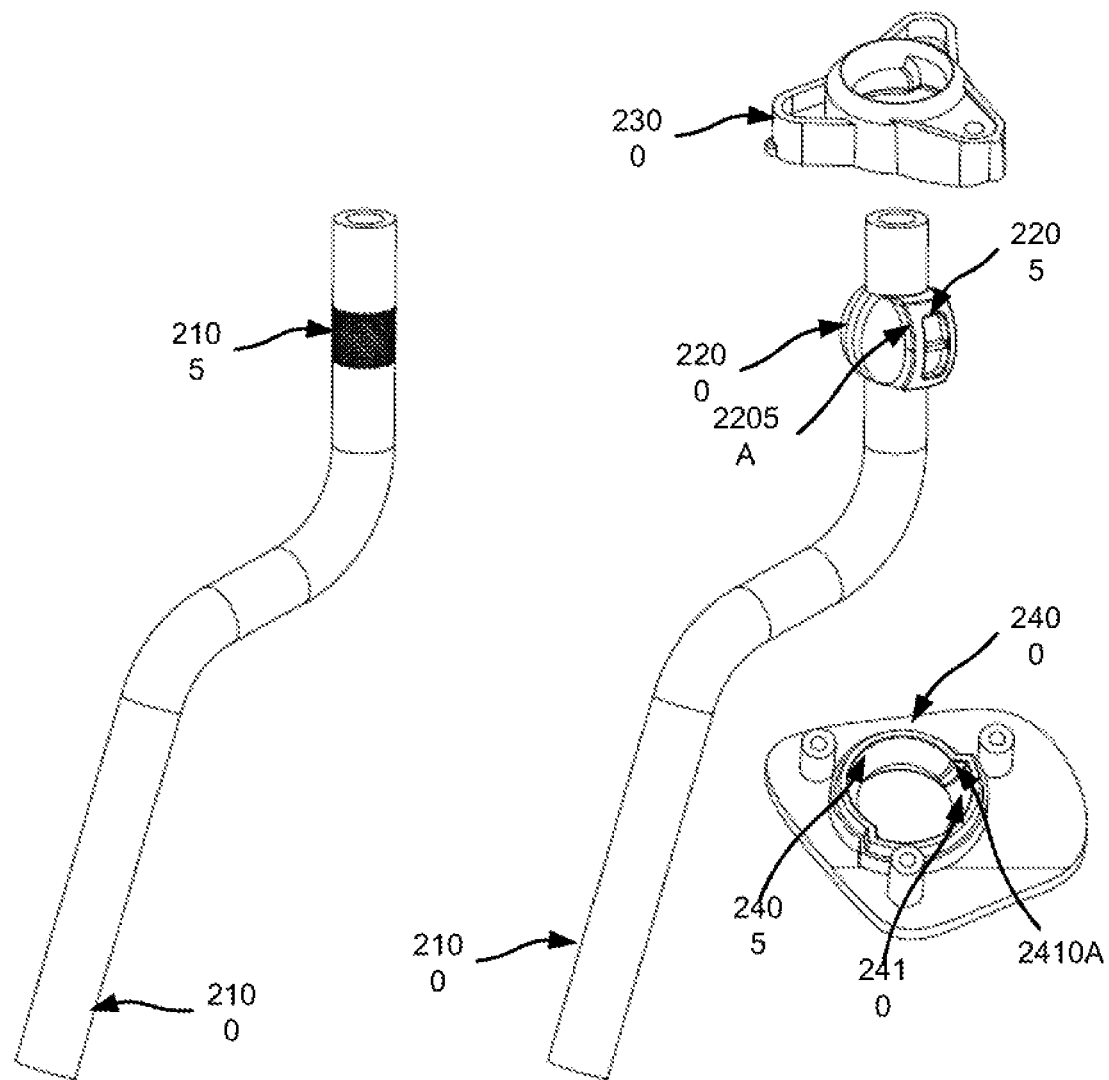
FIG. 20 shows the steam wand before and after the ball over mould has been applied, and also the housing and bracket.

The housing 2400 and bracket 2300 may be made from a range of materials, and the simple form of the parts is conducive to die-cast alloy, such as aluminum, or injection moulded plastic. In this embodiment the housing 2400 is made of ABS and the bracket 2300 is made of nylon. As shown in FIG. 20, the housing 2400 has a concave receiving surface 2405, which defines a substantially part-spherical dome shape that complements the shape of the ball 2200. Similarly, as shown in FIG. 21, the bracket 2300 also has a concave receiving surface 2305, which defines a substantially part-spherical dome shape that complements the shape of the ball 2200.

In this embodiment, the housing 2400 is provided with 3 bosses that each define through holes, and the bracket 2300 is provided with 3 corresponding through holes to accommodate fixing means such as screws (not shown) for mounting the ball receiving assembly to the espresso machine.

Figure 21:
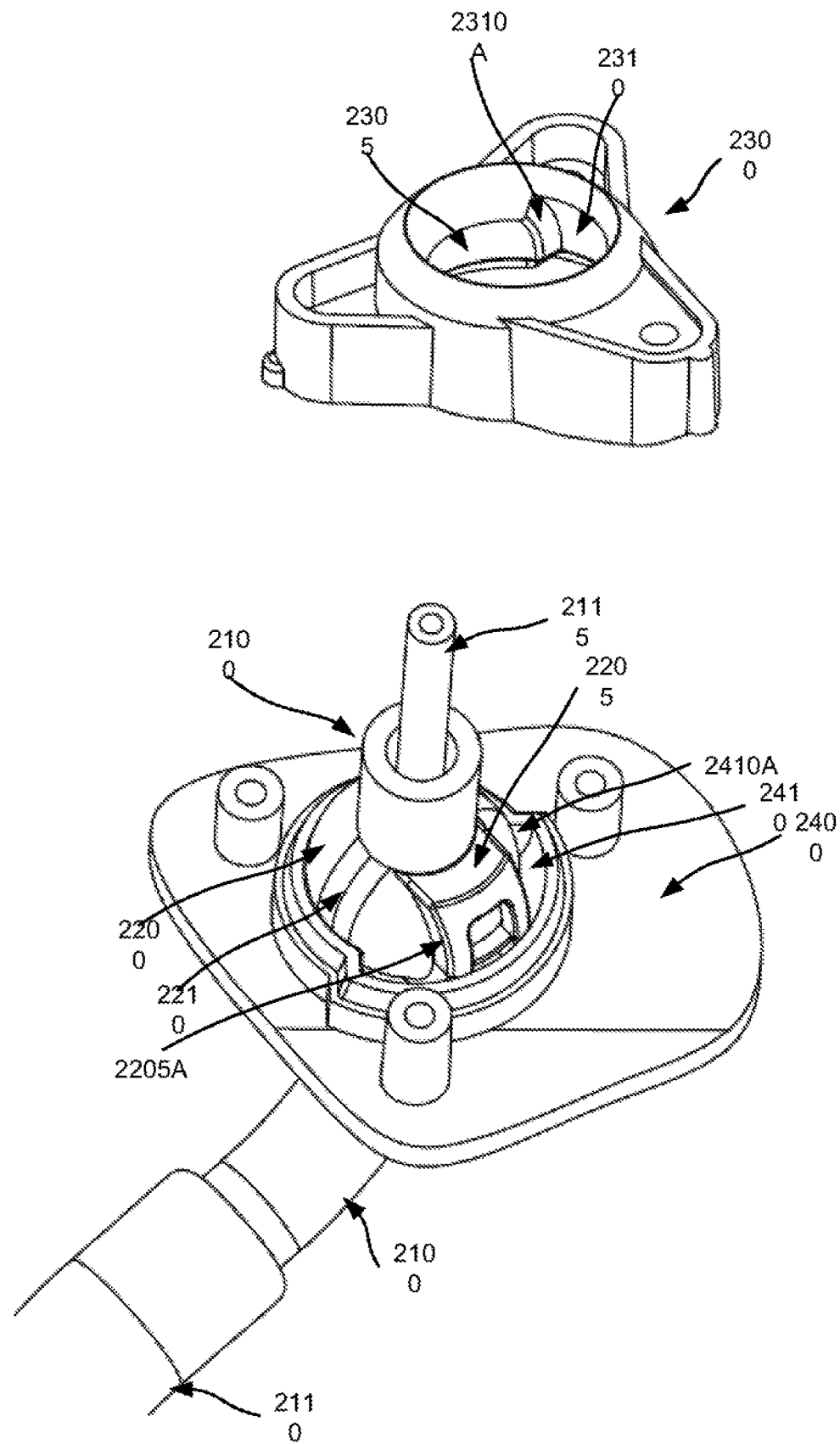
FIG. 21 shows the steam wand and ball assembled into the housing.
Figure 22:
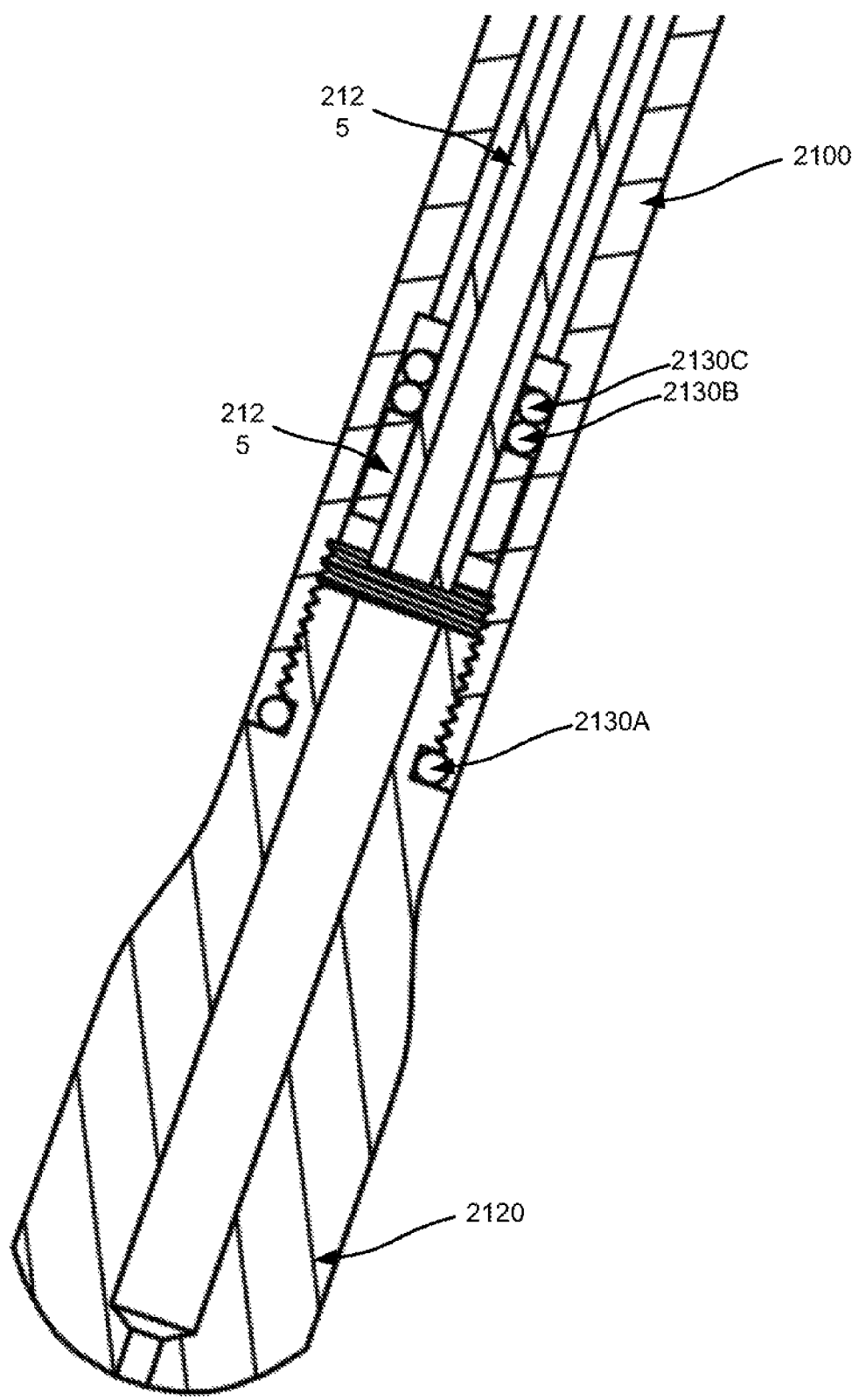
FIG. 22 is a detailed section view of the steam tip assembly.

FIG. 21 shows the steam wand tube 2100 and ball 2200 assembled into the housing 2400, with the bracket 2300 not assembled to show how the ball 2200 fits into the socket of the housing 2400. The ball 2200 has a protrusion 2205 with side faces 2205A aligned with the axis of the steam wand tube 2100. The outer face of the protrusion 2205 is spherical and concentric with the ball center. The complemental concave receiving surfaces 2405, 2305 of the housing 2400 and bracket 2300 match the surface of the ball 2200, as discussed above, and also include recesses 2410, 2310 that accommodate the protrusion 2205. The side faces 2205A of the protrusion 2205, and the side faces 2410A, 2310A of each of the recesses 2410, 2310 have an angular off-set which allows the steam wand tube 2100 to rotate around the axis of the steam wand tube 2100, by the angular off-set amount. Once the steam wand tube 2100 is rotated to the angle that a side face of the protrusion 2205 and a side face of the recesses 2410, 2420 meet, the rotation is stopped by the contact of these two faces. In this embodiment the axial rotation of the steam wand is limited to ±45°, or a total rotation of 90°.

In other embodiments the rotation about the axis may not be limited. In some of these other embodiments, the upper end of the steam wand tube opens within the bracket, and steam is supplied to the steam wand tube via the bracket.

The steam wand tube 2100 extends beyond the ball over-mould thereby providing a cylindrical surface for the injection tool to shut off on and seal against during plastic injection moulding of the ball 2200. In one example embodiment the tooling partline 2210 on the ball 2200 may be slightly recessed from the outer surface of the ball 2200, to minimise the possibility of flash from the injection moulding process making contact with the housing 2400 and bracket 2300. In turn, this reduces the chance of the flash forming an edge that could potentially catch in the housing 2400 or bracket 2300 and feel uneven through rotation of the steam wand tube (2100).

The housing 2400 and the bracket 2300 have a round hole in the bottom and the top respectively to allow the steam wand tube 2100 to exit the machine and the inner flexible steam tubing 2115 to enter the steam wand tube 2100 respectively. The shape of the holes in the housing 2400 and bracket 2300 are conical such that rotation of the steam wand tube 2100 on either axis perpendicular to the steam wand tube axis causes the steam wand tube 2100 protruding beyond the ball 2200 to contact the housing 2400 and the bracket 2300 at the same time, limiting any further rotation in this direction. In this embodiment the angle of rotation perpendicular to the wand axis (i.e. the tip of the steam wand tube moving up/down or left/right) is ±22.5° or a total movement of 45°.

As shown in FIG. 19, the inner flexible steam tubing 2115, which in the preferred embodiment is Teflon, plumbs the steam (or hot water) to the steam wand tip 2120 and is fed the length of the steam wand tube 2100 and is fixed and sealed at the steam wand tip 2120. As depicted in the detailed section of FIG. 22, one way of achieving this is to feed the (Teflon) inner flexible tubing 2115 through the steam wand tube 2100, and crimping a collar 2125 onto the inner flexible tubing 2115. The collar diameter fits into a mating diameter in the steam wand tube 2100 which stops at a shoulder of smaller diameter. The smaller diameter prevents the collar 2125 from moving up through the steam wand tube 2100. O-ring seals 2130B-C may be fitted above the collar 2120 to seal between the inner flexible tubing 2125 and the steam wand tube 2100, preventing steam or milk from entering the steam wand cavity, and preventing the inner flexible tubing from inadvertently retracting up through the steam wand tube 2100. The steam wand tip 2120 may be affixed with a thread, and an o-ring seal 2130A against steam escaping through the joint between the steam wand tube 2100 and tip 2120.

Many other variations to the espresso machine, related manufacturing methods, and respective components, are possible and considered within the scope of the claims. Moreover, the components can be sized and shaped depending on the overall intended use and/or application of the espresso maker and can be varied, to at least some extent, without departing from the scope of the present invention.

It is specifically intended that the present disclosure not to be limited to the embodiments and illustrations contained herein, but include modified forms of those embodiments including portions of the embodiments and combinations of elements of different embodiments as come within the scope of the following claims.

We claim:

1. An espresso machine comprising:
   a user interface for selecting a mode of operation;
   a pump;
   a water heater in fluid communication with the pump;
   a flow meter for monitoring a volume of water;
   a mechanical valve assembly in fluid communication with the water heater, the mechanical valve assembly including at least two mechanical valves for routing fluid from the water heater, wherein the at least two mechanical valves are opened and closed via a rotary valve cam shaft which is mechanically coupled to a rotatable dial which operates as the user interface, and wherein the at least two mechanical valves include two or more of:
   (a) a first valve for selectively opening and closing fluid communication to a brewing mechanism;
   (b) a second valve for selectively opening and closing fluid communication to atmosphere; and
   (c) a third valve for selectively opening and closing fluid communication to a steam wand or hot water outlet; and
   a plurality of switches and a microcontroller, wherein the plurality of switches is responsive to the rotary valve cam shaft to communicate a position of the shaft to the microcontroller, different positions of the shaft are encoded by the plurality of switches being in a particular state, and the microcontroller is adapted to distinguish between these different positions based on a previous position of the shaft.

2. The espresso machine of claim 1, wherein the mechanical valve assembly includes the first valve and at least one of the second and third valves, and wherein one mode of operation is a brewing mode, in which the first valve is selectively opened and the remaining valves are selectively closed.

3. The espresso machine of claim 1, wherein the mechanical valve assembly includes the third valve and at least one of the first and second valves, and wherein one mode of operation is a steam or hot water mode, in which the third valve is selectively opened and the remaining valves are selectively closed.

4. The espresso machine of claim 2, wherein the mechanical valve assembly includes the second valve and at least one of the first and third valves, and wherein one mode of operation is an "off" mode, in which the second valve is selectively opened and the remaining valves are selectively closed.

5. The espresso machine of claim 4, wherein the mechanical valve assembly includes the first, second and third valves and, upon changing a selection of the mode of operation from the brewing mode to the "off" mode, the first valve and the second valve are selectively opened and the third valve is selectively closed by rotary valve cam shaft, thereby allowing venting of pressure.

6. The espresso machine of claim 1, wherein each valve in the mechanical valve assembly includes a valve tappet having a follower end, which is spring biased against a cam of the camshaft, and a valve head, and the mechanical valve assembly includes a valve block defining valve cylinders within which the valve tappets reciprocate between open and closed positions on valve seats in response to rotation of the camshaft, the mechanical valve assembly further including a valve block cover which defines a valve chamber in conjunction with a valve block, the valve chamber selectively communicating via valve cylinders with the atmosphere, a brewing mechanism and the steam wand or hot water outlet.

7. The espresso machine of claim 1, wherein the pump is shut down upon detection of a predetermined volume of water through the flow meter.

* * * * *